United States Patent
Houlette et al.

(10) Patent No.: US 11,836,191 B2
(45) Date of Patent: Dec. 5, 2023

(54) SYSTEM AND METHOD FOR AUTOMATED RECORD CREATION AND MANAGEMENT

(71) Applicant: ROYAL BANK OF CANADA, Toronto (CA)

(72) Inventors: Travis Houlette, Toronto (CA); Shane Murphy, Toronto (CA); Derek Hopfner, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 113 days.

(21) Appl. No.: 17/509,664

(22) Filed: Oct. 25, 2021

(65) Prior Publication Data

US 2022/0043865 A1    Feb. 10, 2022

Related U.S. Application Data

(62) Division of application No. 16/137,604, filed on Sep. 21, 2018, now Pat. No. 11,157,569.

(51) Int. Cl.
*G06F 7/00*     (2006.01)
*G06F 16/93*    (2019.01)
*G06Q 10/067*   (2023.01)
*G06F 16/23*    (2019.01)
*G06F 16/338*   (2019.01)

(52) U.S. Cl.
CPC ............. *G06F 16/93* (2019.01); *G06F 16/23* (2019.01); *G06F 16/338* (2019.01); *G06Q 10/067* (2013.01)

(58) Field of Classification Search
CPC ......... G06F 16/93; G06F 16/23; G06F 16/338
USPC .................................................. 707/600–899
See application file for complete search history.

(56) References Cited

U.S. PATENT DOCUMENTS

| 9,286,403 | B2 | 3/2016 | Papa et al. |
| 9,672,524 | B2 | 6/2017 | Papa et al. |
| 2011/0289041 | A1* | 11/2011 | Hunt ............... G06Q 10/06311 706/50 |
| 2017/0180372 | A1 | 6/2017 | Bezold |
| 2017/0270537 | A1 | 9/2017 | Papa et al. |

* cited by examiner

*Primary Examiner* — Isaac M Woo
(74) *Attorney, Agent, or Firm* — NORTON ROSE FULBRIGHT CANADA LLP

(57) ABSTRACT

Disclosed is a system for managing corporate information, including at least one database configured to store a set of corporate information, a set of corporate templates, and a set of interconnected corporate records, a record bank module coupled to the database and configured to receive record generation requests and create records, a corporate logic module connected to the record bank module setting out a set of logic rules relating to a set of corporate governance compliance requirements, and a clerk module coupled to the database and the record bank module and configured to file created records with third parties. Also disclosed are a method of maintaining a corporate document collection and a method of ongoing monitoring of corporate compliance requirements and the generation and submission of documents to meet those compliance requirements.

20 Claims, 39 Drawing Sheets

Hi director two,

You've been asked to sign some documents director one has requested your signature on the following documents:

* By-Laws
* First Director Resolution
* First Shareholder Resolution
* Director Consent
* Notice Of Issuance Of Uncertificated Shares
* Subscription For Shares Select the document you would like to sign first or click below to begin the full signing process.

FIG. 12A 2910   2920

SYSTEM AND METHOD FOR AUTOMATED RECORD CREATION AND MANAGEMENT

CROSS-REFERENCE TO RELATED APPLICATION

This application is a divisional of U.S. patent application Ser. No. 16/137,604, filed Sep. 21, 2018, entitled, "SYSTEM AND METHOD FOR AUTOMATED RECORD CREATION AND MANAGEMENT", which is hereby incorporated by reference in its entirety.

FIELD OF THE INVENTION

The present specification relates generally to a tool for creating and managing records, and specifically to a tool for the creation and management of corporate records.

BACKGROUND OF THE INVENTION

Many activities result in a collection of documents and other records which need to be created, organized, signed, stored, made available, and updated.

As an example, the creation and ongoing maintenance of an organization such as a corporation often entails the creation and ongoing maintenance of several organizational documents and other records.

Records related to a corporation are often created or updated to begin or to complete a phase or stage of an activity or plan. Many of these records also need to be filed with, or submitted to, one or more official body. For example, in the context of incorporation, the official body may be a government incorporation authority or other government agency. Many documents also need to be updated and refiled or resubmitted periodically.

As documents and other records related to a corporation are created, there often arises a need to organize and preserve them. Record keeping requirements may be set by various internal or external actors, such as government agencies, investors, or others. In many cases all a company's documents are interconnected.

Practical concerns behind record keeping may also influence how the documents are made accessible for review or change, including updating and augmentation. In various circumstances owners, directors, officers and employees of corporations may desire or need access to documents related to a corporation. For example, an officer of a corporation may need to review documents in the pursuit of the officer's duties. In another example, an investor may wish to access the documents to inform themselves.

SUMMARY OF THE INVENTION

In an embodiment of the present invention, there is provided a system for managing corporate information, comprising at least one database configured to store a set of corporate information associated with a designated corporation, a set of corporation-specific logic rules associated with the designated corporation, a set of corporate records associated with the designated corporation, and a set of corporate templates; a record bank module coupled to the at least one database, the record bank module configured to receive a corporate record request from a managing user requesting the creation of a new corporate record to be added to the set of corporate records, and, in response to the corporate record request: determine a requested corporate template of the set of corporate templates matching the corporate record request, determine a set of requested record information needed to populate the requested corporate template, populate the set of requested record information from the set of corporate information, the set of corporation-specific logic rules, and the set of corporate records; generate the requested corporate record from the set of requested record information and the requested corporate template, and update the set of corporate records to include the requested corporate record in the at least one database; and an external-interfacing clerk module coupled to the at least one database and the record bank module, the external-interfacing clerk module configured to determine that an action is needed and to perform the action, the action including at least one of submitting a record of the set of corporate records to an official body or updating a record of the set of corporate records in response to a notice from the official body.

In an embodiment of the present invention, there is provided a method of maintaining a corporate document collection, comprising determining at a record management system a set of initiating information needed from an initiating user to generate a corporation initiation request to be sent to an incorporation authority; prompting, through a digital interface generated by the record management system, an initiating user to provide the set of initiating information; receiving at the record management system the set of initiating information from the initiating user; generating at the record management system the incorporation request; submitting the incorporation request to the incorporation authority from the record management system; generating at the record management system a set of initial documents and storing the set of initial documents in the corporate document collection in a document library; receiving a document update event notice at the record management system; determining at the record management system an update set of documents to be updated in response to the document update event notice; updating the update set of documents and adding the updated update set of documents to the corporate document collection; and providing ongoing access to the corporate document collection to a managing user through the digital interface.

In an embodiment of the present invention, there is provided a method of maintaining a corporate document collection, comprising receiving, at a record management system, a set of foundational information corresponding to a corporation; receiving, at the record management system, a template corporate record; receiving, at the record management system, a set of corporate logic rules relating to a set of corporate governance compliance requirements; determining, at the record management system and by application of the set of logic rules, that a corporate record is required; generating, at the record management system, the corporate record from at least the set of foundational information and the template corporate record; determining, at the record management system, a government authority that requires the corporate record; and submitting the corporate record to the government authority.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which:

FIG. 7B shows a screenshot of a second company information screen generated by the record management tool of FIG. 1;

FIG. 12A shows a screenshot of a first prompt generated by the record management tool of FIG. 1;

DETAILED DESCRIPTION OF THE EMBODIMENTS

Figure 1:
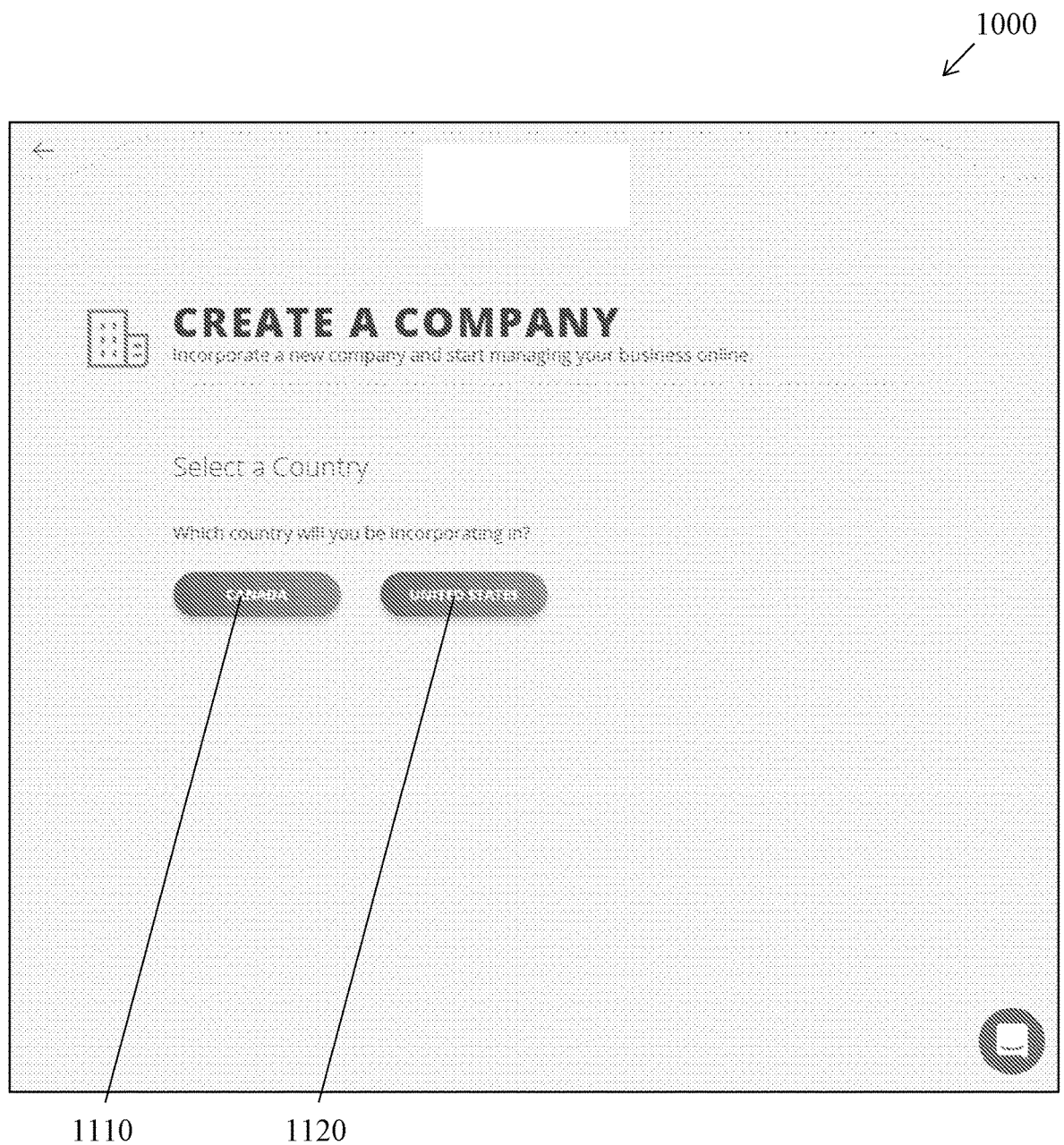
FIG. 1 shows a screenshot of a first jurisdictional information collection screen generated by a record management tool, according to an embodiment.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

An aspect of this description relates to a tool for creating, organizing, storing, accessing, or updating a collection of interconnected records, such as corporate documents or other records. In some embodiments, this record management tool maintains a collection of foundational information to be used in generating documents and other records.

In some embodiments, the tool includes a record bank module and integrated corporate logic module to receive information from a managing user of the tool and to create and maintain the collection of foundational information. For example, the record bank module may receive answers from the managing user in response to directed prompts based on information requests from the record bank module, or the record bank module may retrieve information from documents or other records received by the record bank module from the managing user or another source.

In some embodiments, the record bank module is also configured to create new documents using the collection of foundational information and a number of templates or other frameworks coupled with the corporate logic module that verifies the completeness of documents and determines future actions that may need to be undertaken, such as the filing of particular documents through the clerk module. In some embodiments, a template of a document is a collection of all generic information that could be needed in creating the document, and is provided for use with a collection of logic rules to determine what corporate information and other user-input information is needed to finalize the document, how much of the generic information will be included in the finalized document, and how the finalized document will be used. In some embodiments, the record bank module applies logic rules stored by the system to determine which records to create, when to create them, what is needed to complete the records, and what to do with the records when completed. For example, when a user initiates an incorporation, the record management system's logic determines that a set of minute book documents are required (such as documents recording issuances of shares, appointment of directors, and implementation of corporate bylaws). As another example, when a user appoints a new director for the corporation, the record management system generates and distributes corporate resolutions to obtain approval for the appointment of the director. For example, the record bank module may be triggered to create a new document or other record by the managing user or by detecting an event, and may then retrieve a template or other framework for the new record, determine what information is needed such as based on the status and structure of the corporation, determine whether any necessary information needed to populate the record is missing from the collection of foundational information, prompt the managing user to provide any missing information to be added to the collection of foundational information, and then generate the new record using the template or other framework populated by the collection of foundational information or a subset of the collection of foundational information. In some embodiments, the record bank module is also configured to update existing records or to update the collection of foundational information in response to a trigger or document update event notice, even if it has not been triggered to create a new document. Records created or updated by the record bank module may be stored with the collection of foundational information, stored separate from the collection of foundational information or used directly.

In some embodiments, when a user creates a legal agreement, the variables they select will change the underlying corporate logic for their company such that when creating another corporate record in the future, the system will know what was previously completed by the company and adjust and tailor the corporate record to reflect past events. For example, if a managing user creates a shareholder's agreement from a record template of a shareholder's agreement and chooses to include a clause which moves power over issuing shares from the directors to the shareholders, when the shareholders agreement is executed the system updates the corporate-specific logic rules so that in the future a shareholder's resolution is prepared when issuing shares rather than a director's resolution.

In some embodiments, a record bank module incorporates or is coupled to a logic module to apply a set of corporate-specific logic rules. In some embodiments, a logic module also maintains and updates the set of corporate-specific logic rules, such as in response to detecting an event or in response to instructions from another module.

Various embodiments may provide different levels of access to different classes of users, different categories of users, or users with different clearance levels, separately or simultaneously in a particular corporate platform account. For example, some users may be view-only users, some users may be able to approve changes to information, some users may be able to change information, some users may be able to both change and approve changes, and some users act as gatekeepers with the ability to review and approve the actions of all other users connected to an account.

In some embodiments, the tool includes a clerk module such as an AutoClerk module to file records with relevant third parties, such as incorporation authorities and other government authorities. For example, the AutoClerk module may receive a document from the record bank module and submit the document to an incorporation authority, a tax authority, a securities authority, or another government authority.

In some embodiments, the AutoClerk module also collects communications and other information from the relevant third parties. For example, the AutoClerk module may interface with an incorporation authority, receive a notice of approval of an incorporation request sent to the incorporation authority by the AutoClerk module, and provide the notice of approval record to the record management system. In some embodiments, the AutoClerk module also reviews information received from the relevant third parties and contributes relevant items of information to the collection of foundational information.

In some embodiments, the record management system is configured to receive a request to set up a records management storage for an existing corporation. In such embodiments the collection of foundational information may be accepted from a combination of existing documents, user input, and third-party information. In such embodiments some of the documents which the system would otherwise create are simply imported, such as via user uploads, and such documents may also be parsed to extract information. In such embodiments, some of the AutoClerk module steps are also skipped. For example, the AutoClerk may no longer be directed to submit a document to an incorporation authority; it may be limited to submitting documents in connection with ongoing compliance requirements such as tax documents submitted to a tax authority.

FIGS. 1 to 20 depict a series of screenshots of screens generated by an embodiment of a record management tool in connection with the creation or maintenance of a corporation.

Figure 2:
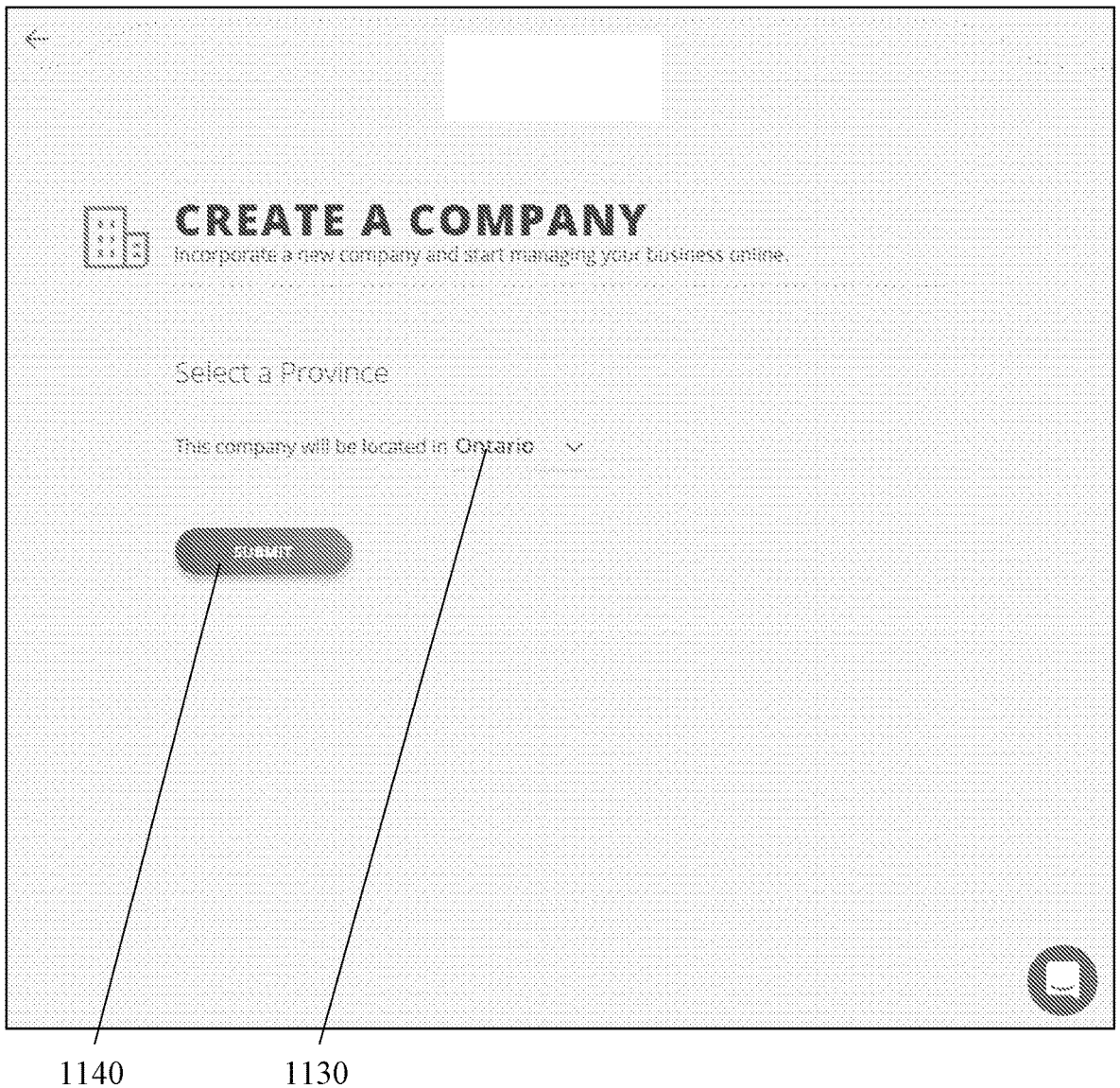
FIG. 2 shows a screenshot of a second jurisdictional information collection screen generated by the record management tool of FIG. 1.

The record management tool or system begins the process of creating a collection of records by collecting several jurisdictional details from an initiating user. As shown in FIGS. 1 and 2, a user is prompted to provide information regarding the jurisdiction in which they wish to found a company. In the example screenshots provided, the user is prompted to choose from a number of jurisdictions for which the tool is configured to operate; the user is provided with a toggle 1110 to indicate that the company is to be Canadian, and a toggle 1120 to indicate that the company is to be American. In FIG. 2, the user has indicated that their company will be founded in Canada and is presented with a prompt to indicate the province in which the company will be located. Having indicated a province, such as Ontario, in the indication box 1130, the user may submit the entry using toggle 1140.

Figure 3:
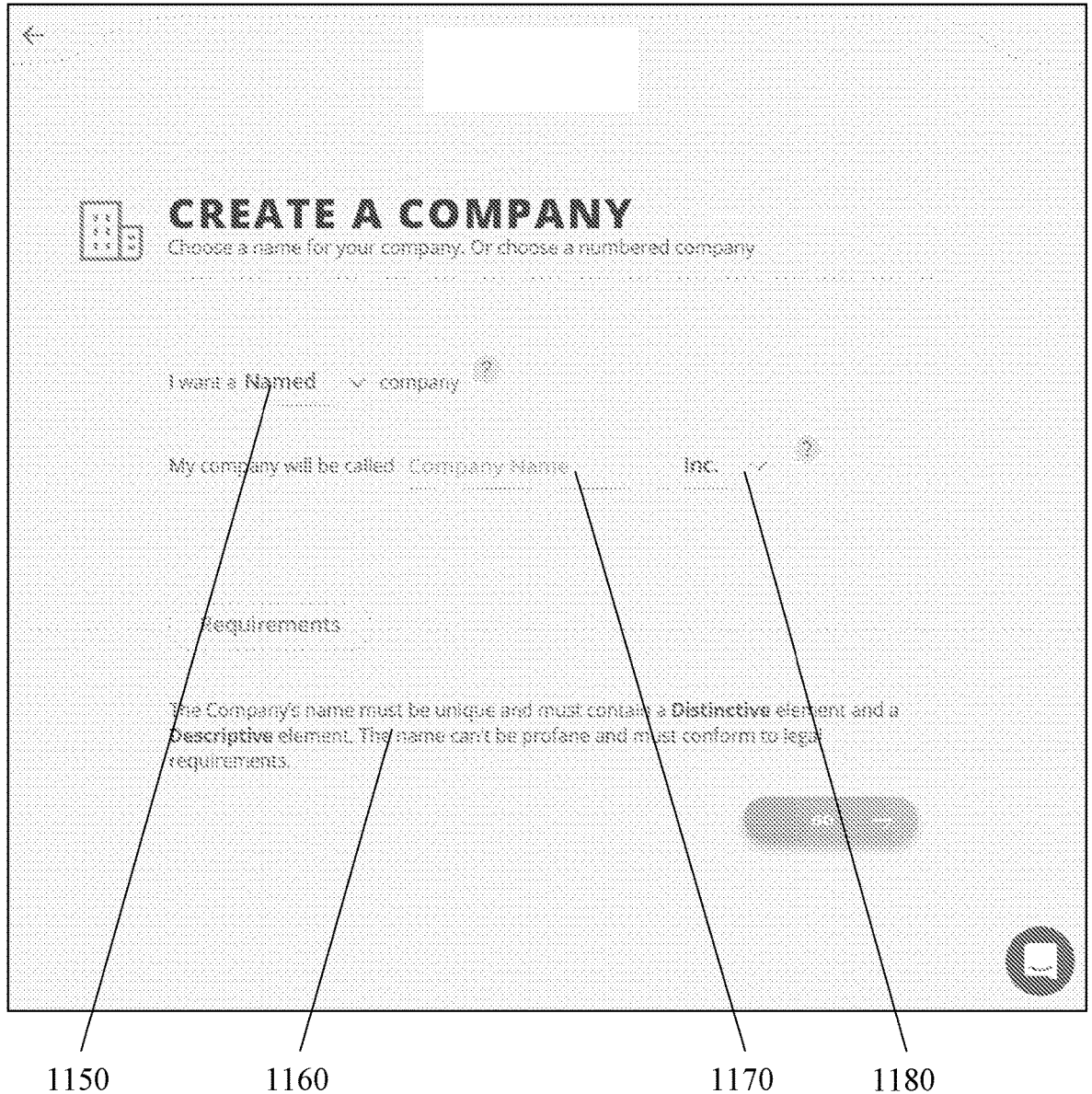
FIG. 3 shows a screenshot of a corporate name input screen generated by the record management tool of FIG. 1.

The record management tool represented by FIGS. 1 to 20 then collects information relating to the name of the corporation that is to be founded. FIGS. 3 to 4D show several screenshots of screens prompting the user to indicate whether their company is to be a numbered company or a named company, and, if they choose a named company, prompting the user to select a reasonable name.

As indicated in the screenshot of FIG. 3, where a user has indicated, such as by choosing an option from dropdown box 1150, that they are interested in a named company, the tool informs the user of a few of the basic requirements for a company name via comment space 1160. The tool also provides a framework for creating a company name by providing the user with a text entry box 1170 to enter a name and a corporation suffix choice dropdown box 1180 from which the user may choose one of the acceptable corporation suffix choices provided.

As indicated in FIGS. 4A to 4D, when the user has indicated a name in text entry box 1170, the record management tool presents the user with preliminary name availability analysis in comment space 1160. As indicated in the figures, the record management tool conducts a search for corporations having similar names and warns the user if a chosen name is very similar to an existing corporate name.

Figure 4A:
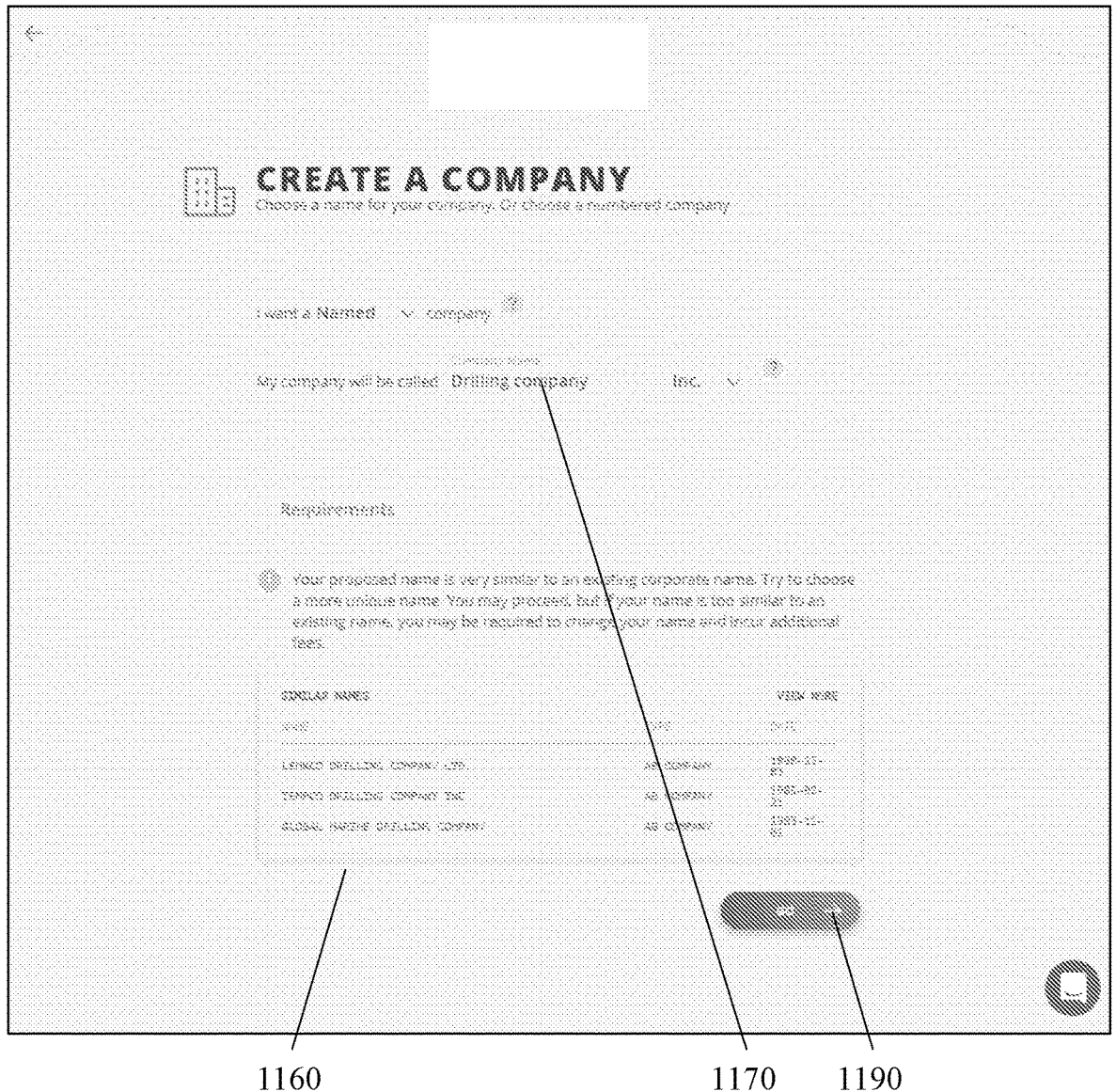
FIG. 4A shows a screenshot of the corporate name input screen of FIG. 3 in which a first example corporate name has been entered.
Figure 4B:
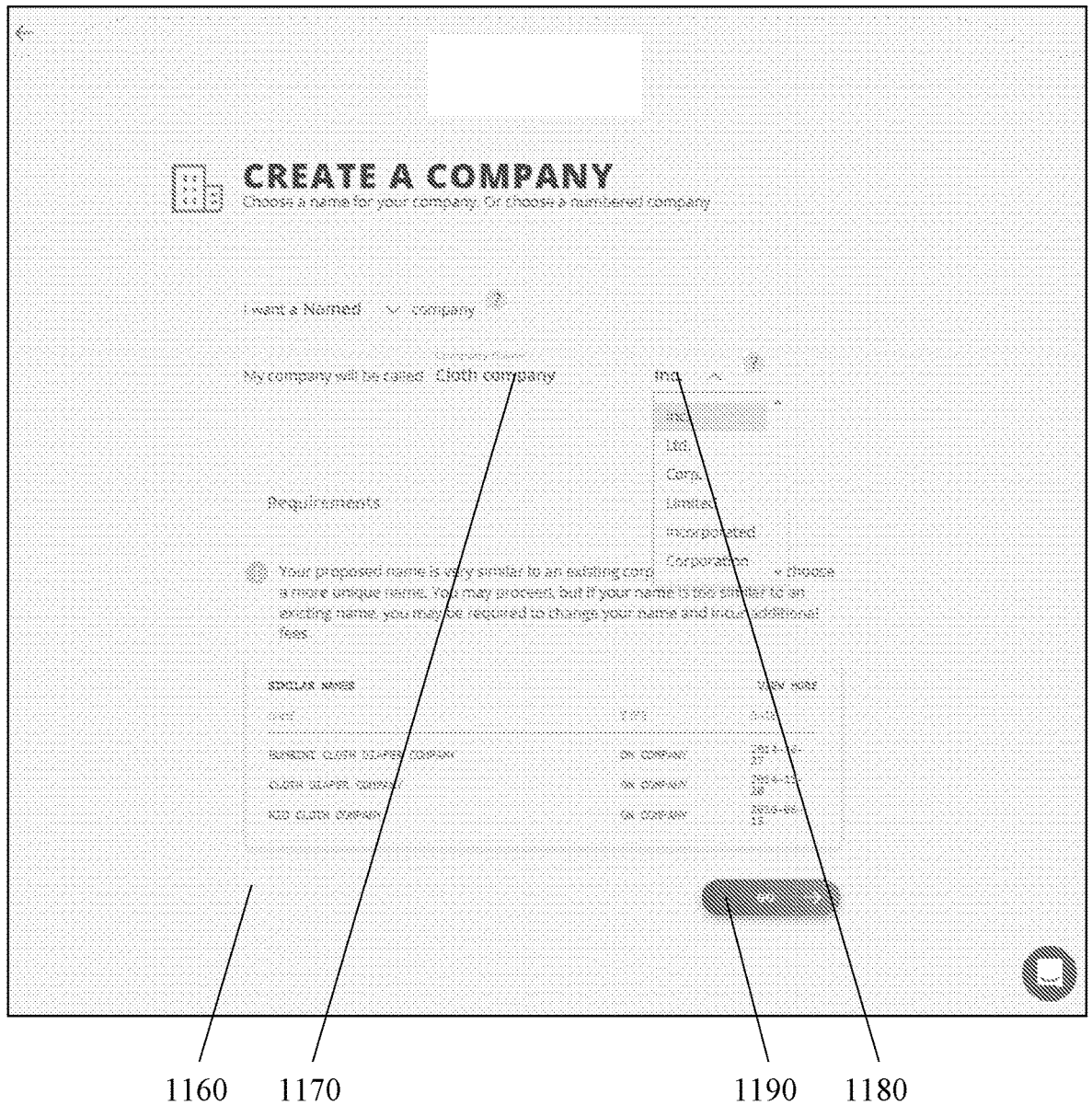
FIG. 4B shows a screenshot of the corporate name input screen of FIG. 3 in which a second example corporate name has been entered.
Figure 4C:
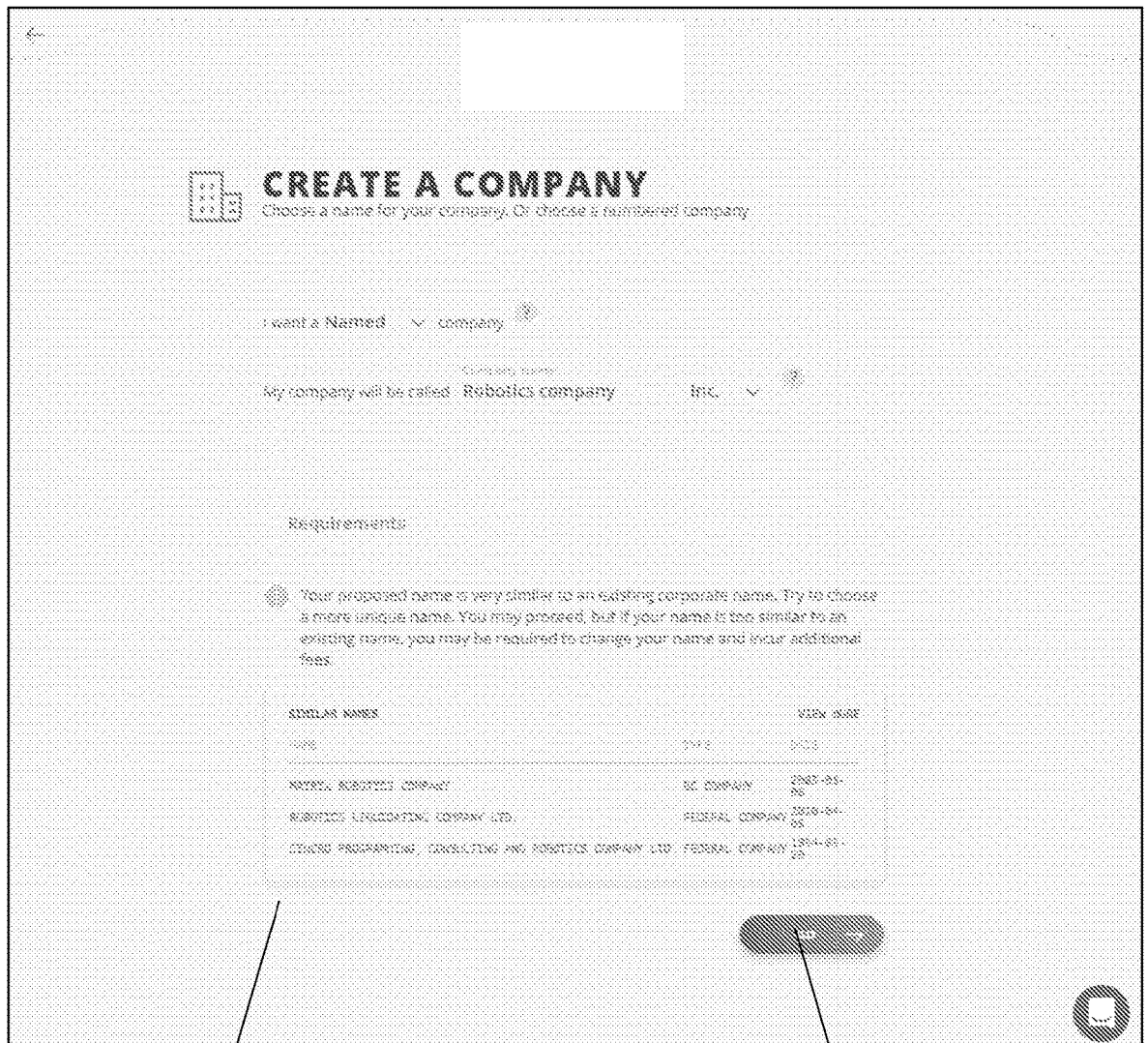
FIG. 4C shows a screenshot of the corporate name input screen of FIG. 3 in which a third example corporate name has been entered.
Figure 4D:
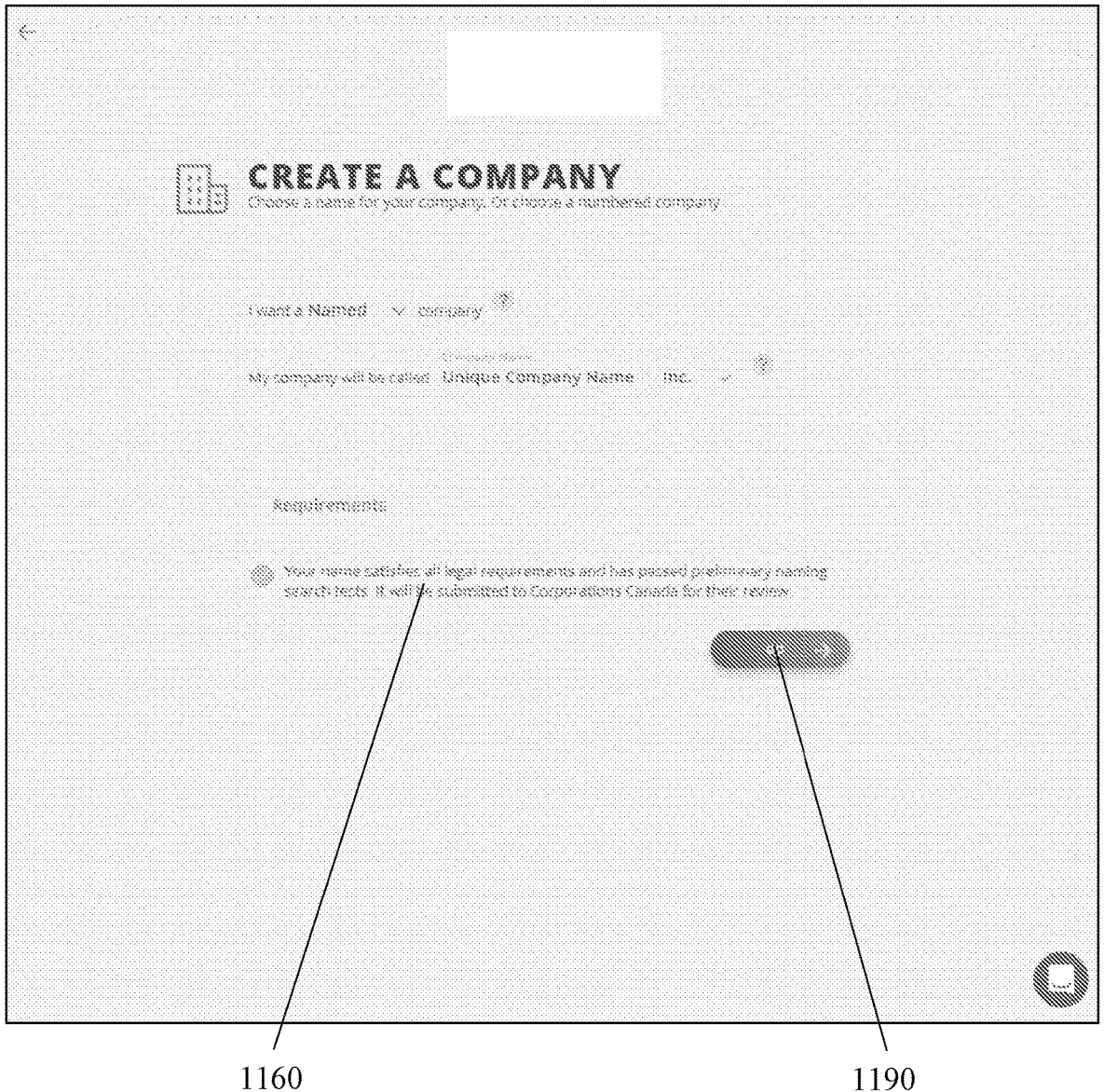
FIG. 4D shows a screenshot of the corporate name input screen of FIG. 3 in which a fourth example corporate name has been entered.

As indicated in FIGS. 4A to 4C for a selection of relatively generic names, in comments space 1160 the tool shows the user a selection of similar names and related information to allow the user to make an informed decision about whether to proceed, by triggering toggle 1190, despite the potential issue. As indicated in FIG. 4D, if a chosen name passes preliminary tests, the record management system indicates as much to the user in comments space 1160 and the user can proceed with the incorporation by triggering toggle 1190. A user may proceed with an incorporation even if issues are found during the preliminary tests, however the user is warned that the issues identified by the preliminary analysis may cause problems later.

Figure 5:
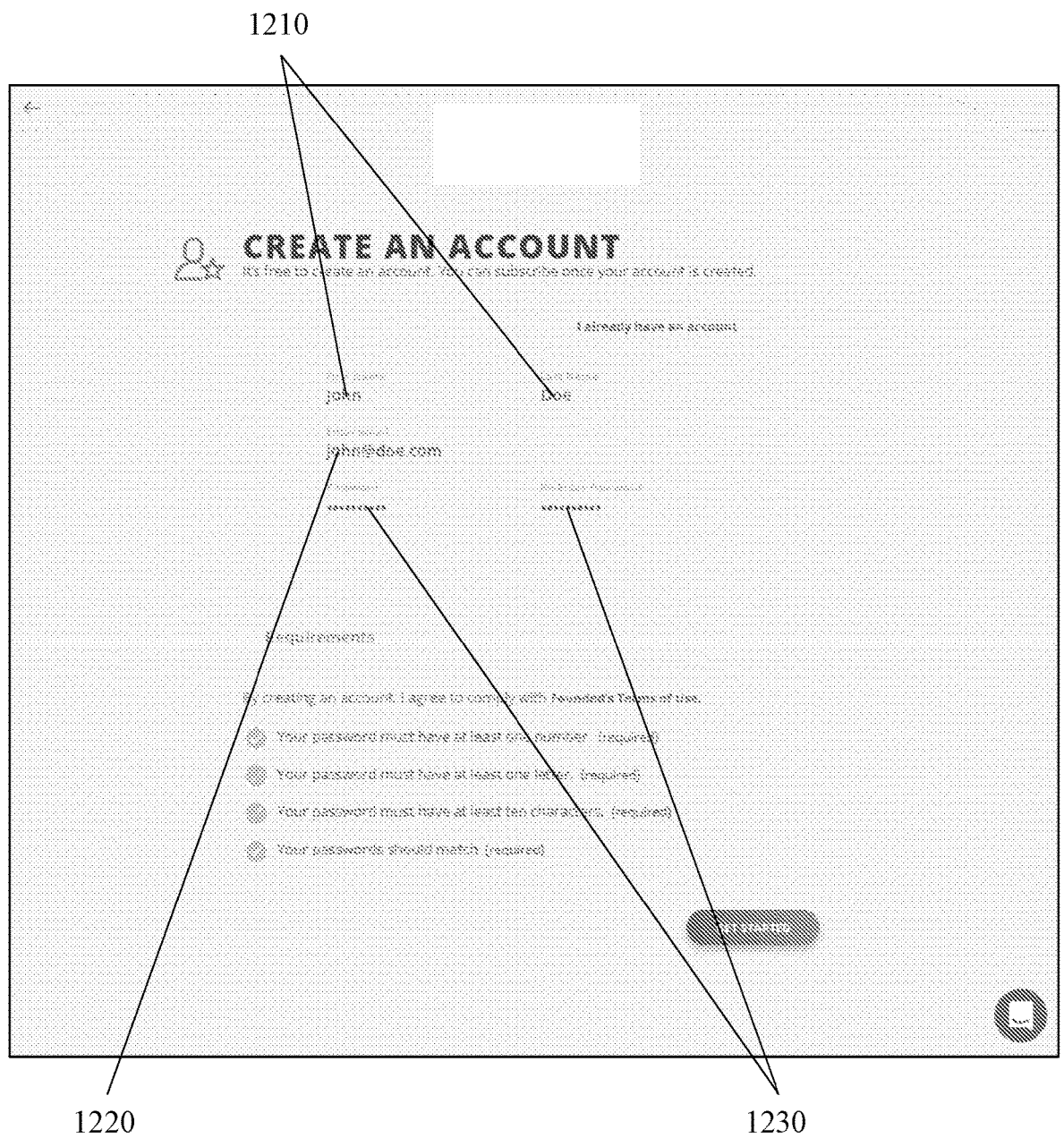
FIG. 5 shows a screenshot of an account creation screen generated by the record management tool of FIG. 1.

To use the record management system to create a company and manage corporate documentation, the user may be required to create an account to be associated with the relevant documentation. FIG. 5 shows a screenshot of an account creation interface asking for a name via boxes 1210, asking for a point of contact via box 1220, and asking for security information via boxes 1230.

When an account has been created, the user is provided with ongoing access to a general document management interface, from which they can view and retrieve documents, view and respond to notifications of actions needed, initiate the creation or updating of documents, review, update, and add to a collection of foundational corporate data created to contain data provided during the corporation initiation process, or take other actions.

Figure 6:
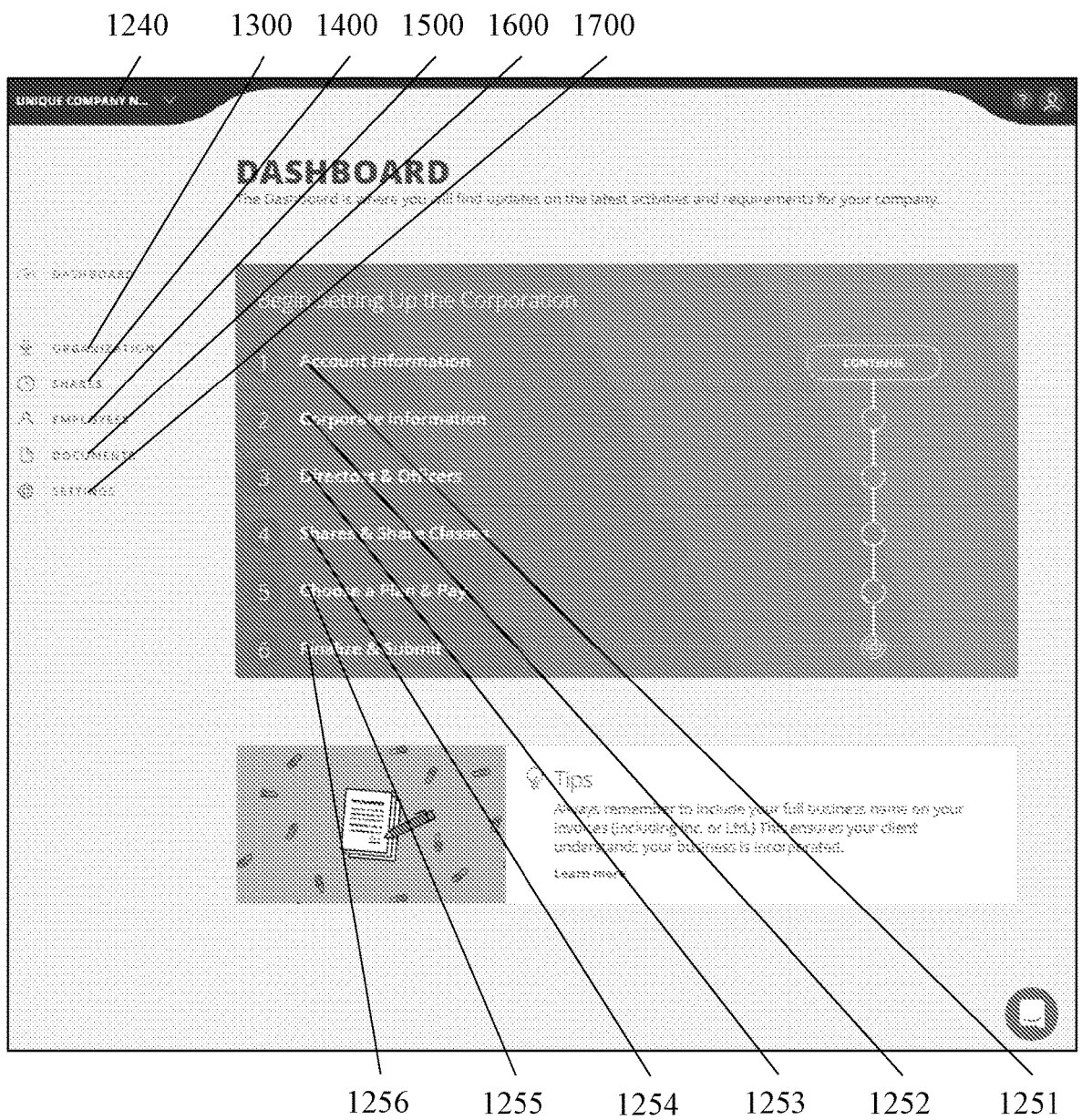
FIG. 6 shows a screenshot of a first dashboard screen generated by the record management tool of FIG. 1.

FIG. 6 is a screenshot of a user account dashboard, providing an authorized user of an account associated with a company called UNIQUE COMPANY NAME with access to company related documents and information. The company corresponding to the dashboard presented to the user is indicated by box 1240, and the user is presented with a list of suggested further account setup actions via toggles 1251, 1252, 1253, 1254, 1255, and 1256 and a list of corporate information heading toggles 1300, 1400, 1500, 1600, and 1700.

If information necessary for the completion of further steps is missing, the user may be prompted to provide the information, as indicated by toggles 1251 to 1256 of FIG. 6. Otherwise the user may simply be allowed to browse and initiate further actions as desired.

Figure 7A:
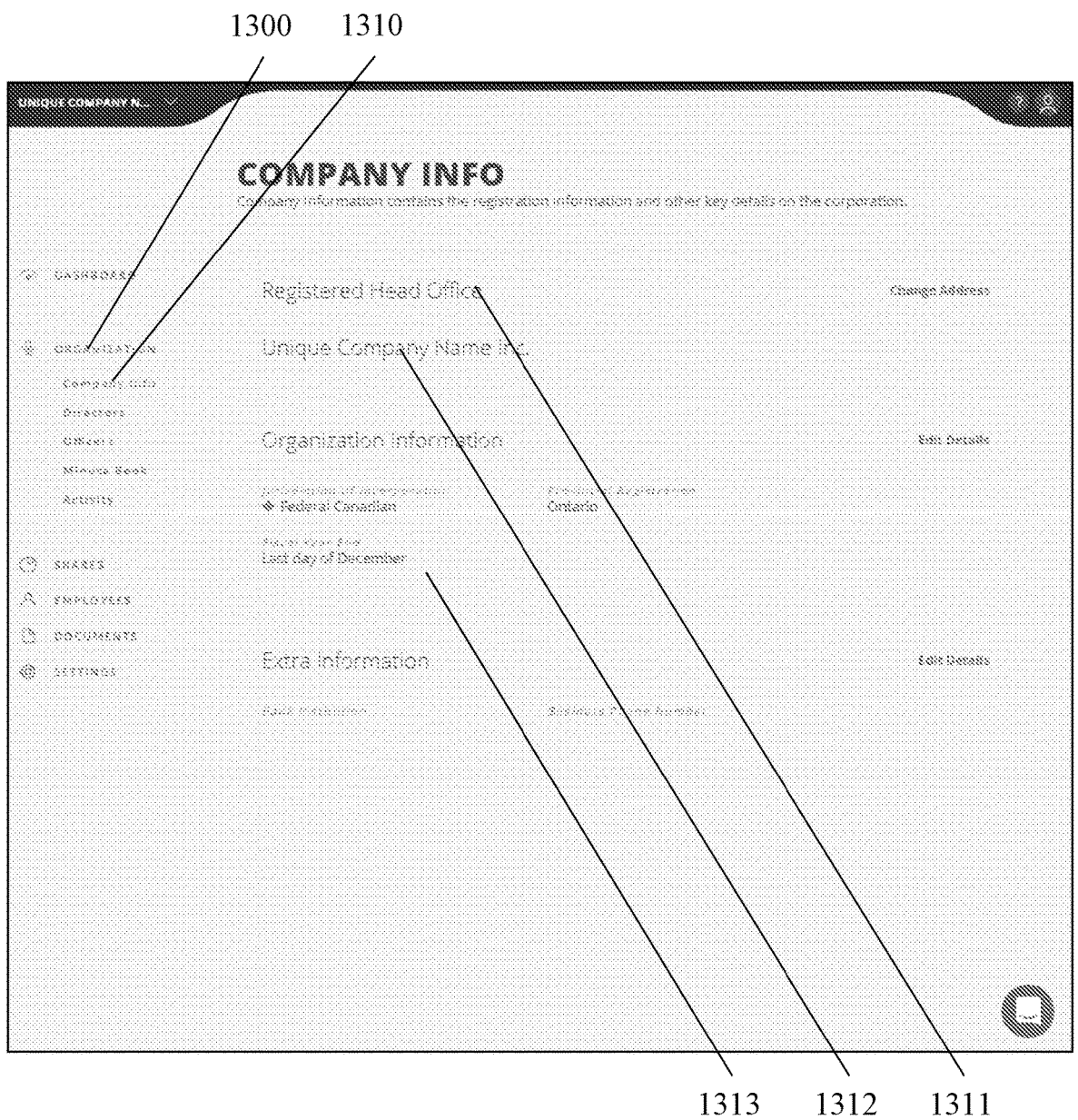
FIG. 7A shows a screenshot of a first company information screen generated by the record management tool of FIG. 1.

For example, if a user triggers heading toggle 1300 they are presented with a listing of related subheadings. If the user chooses subheading 1310, as indicated in FIG. 7A, they are presented with corresponding information. As indicated in FIG. 7A, subheading 1310 corresponds directly to information about the company, much of which would be included in the collection of fundamental information maintained for use in record creation and updating. For example, in some embodiments, information such as the company address as indicated in box 1311, the company name as indicated in box 1312, and the jurisdictional details as indicated in box 1313 would be included in the collection of foundational information maintained for use by a record bank module in creating or maintaining corporate records.

Figure 7B:
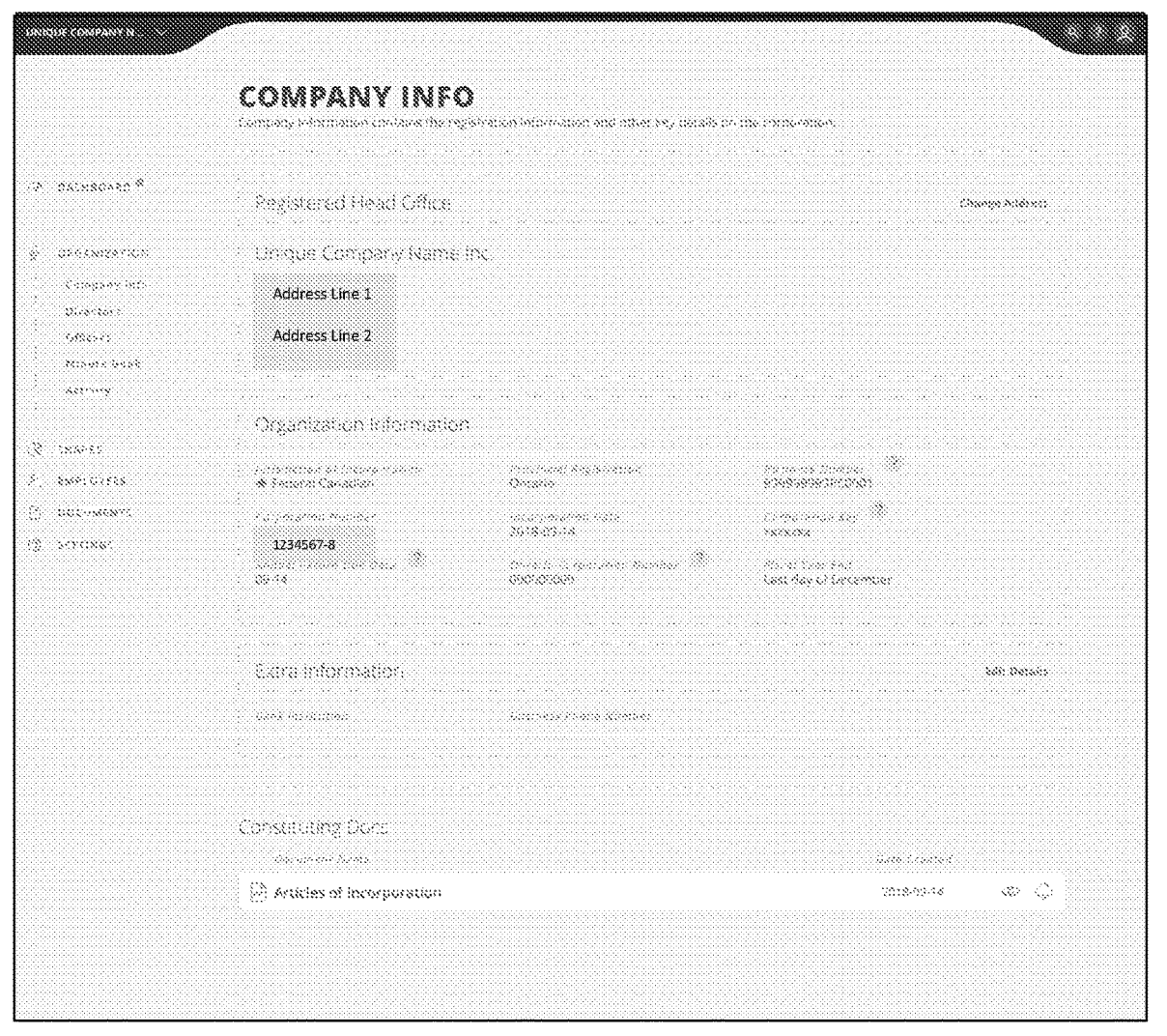

A screenshot of a second COMPANY INFO screen is shown in FIG. 7B. The screenshot of FIG. 7B shows further information about the specified company, including the corporation number, incorporation date, address, and business number. The amount of information displayed to a user may depend on the user's account or the amount of information available to the system. For example, prior to the system receiving a confirmation that the incorporation request was granted the system does not have certain information such as a corporation number.

At various places, the interface may provide users, or certain categories of users, with opportunities to update information as they wish. For example, if a user chooses to add a new director or change a registered address, the interface may automatically prepare the required forms and resolutions, or other records required to register the change with an official body, and may submit the forms or other records to the official body. In some embodiments, the system may detect if information is missing and prompt the next user who interacts with the system for the information or may prompt the next interacting user who meets certain criteria to provide the information. In some embodiments, the system may present prompts for confirmation that information is accurate, such as periodically presenting prompts or presenting prompts following the detection of events.

FIGS. 8, 9, 10, and 11 depict information corresponding to subheadings under heading toggles 1400, 1500, 1600, and 1700, respectively.

Figure 8A:
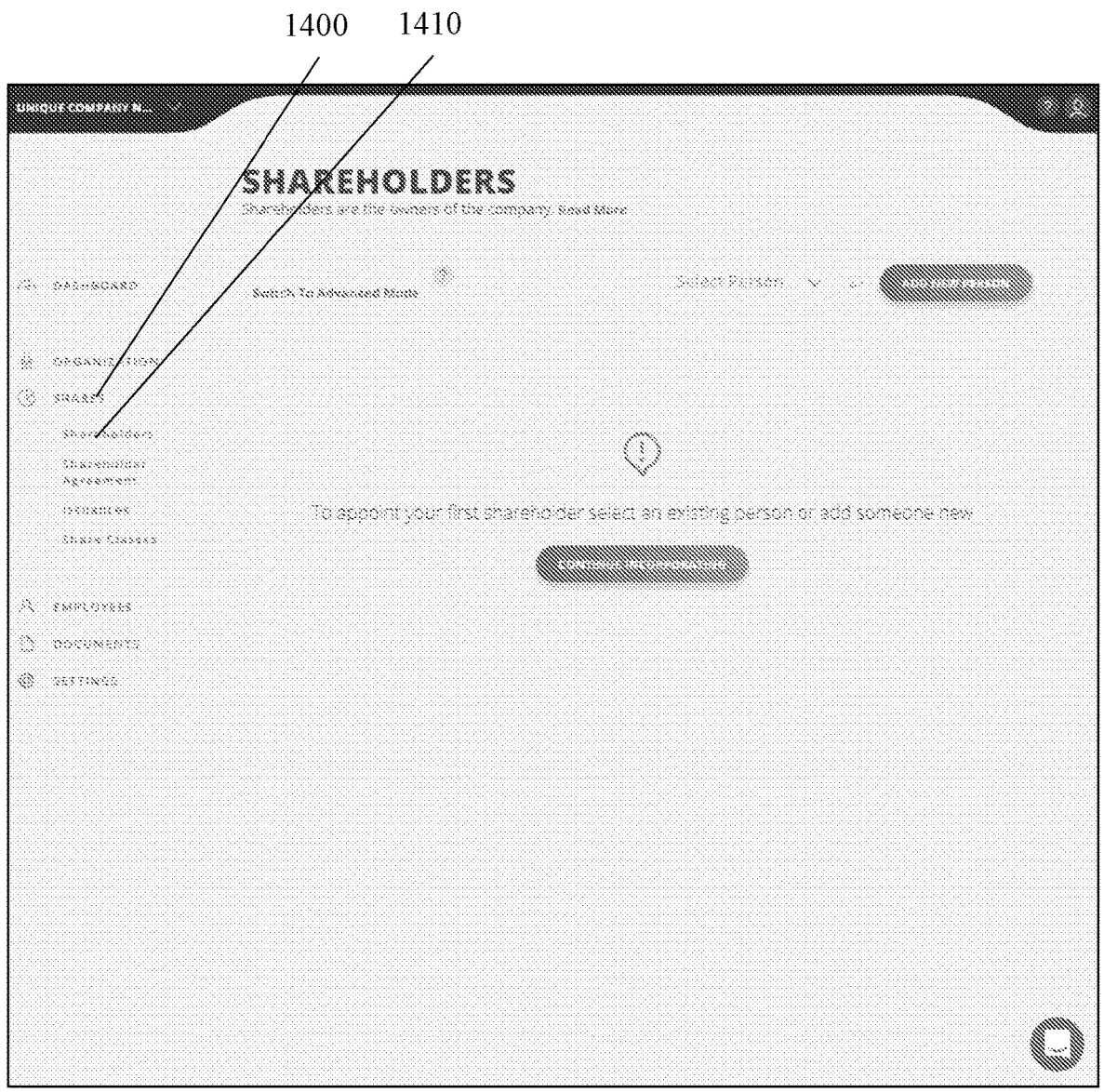
FIG. 8A shows a screenshot of a first shareholder information screen generated by the record management tool of FIG. 1.
Figure 8B:
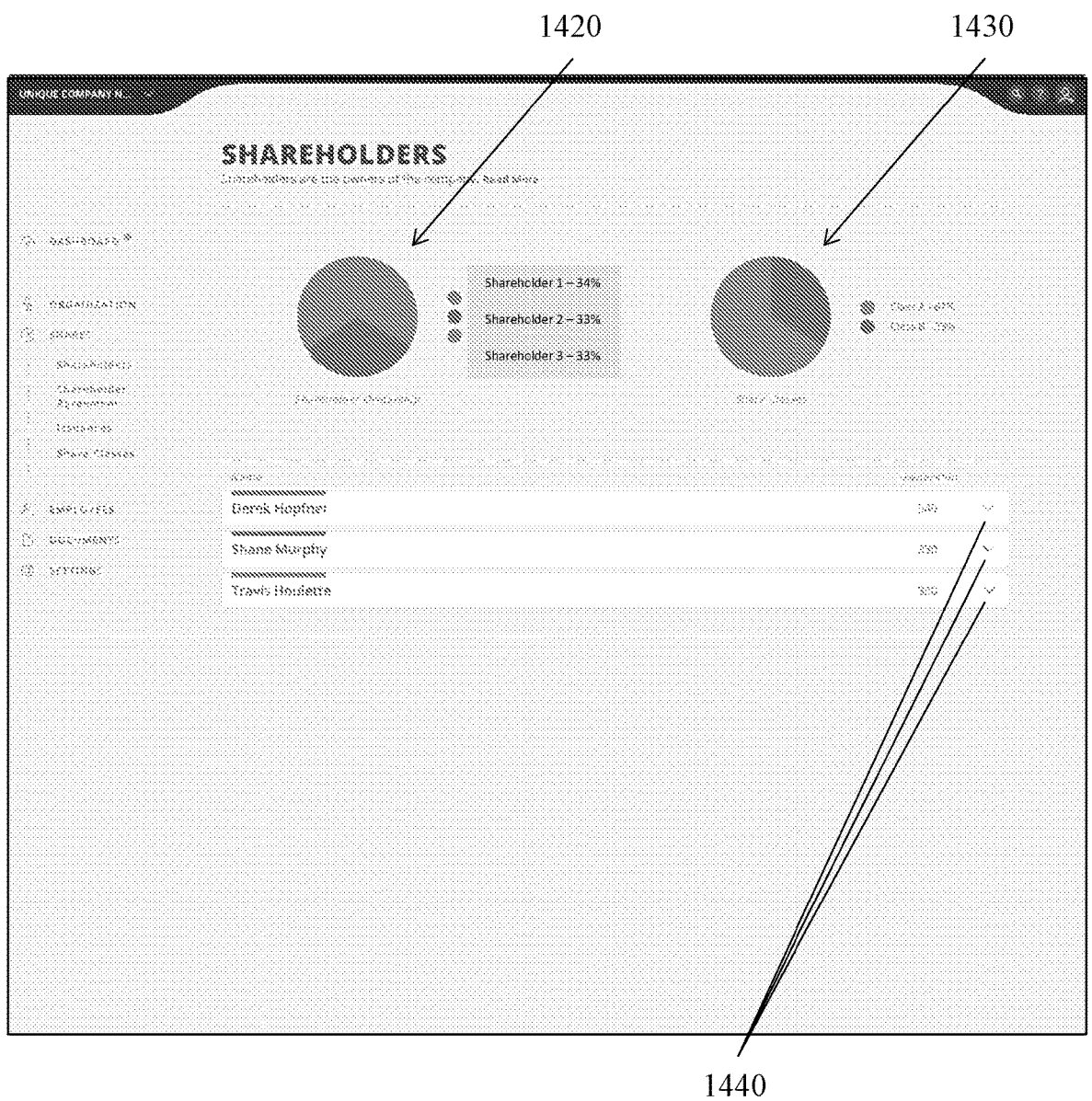
FIG. 8B shows a screenshot of a second shareholder information screen generated by the record management tool of FIG. 1.

FIG. 8A shows an information screen corresponding to subheading toggle 1410. Through heading toggle 1400 a user has access to share information, including information relating to shareholders, information relating to shareholder agreements, information relating to share issuances, and information relating to share classes. FIG. 8A shows an information screen as it is prior to the company being incorporated and the share information determined; further information would be provided once it becomes available and is gathered by the system, including information that would form part of the collection of foundational information. For example, a screenshot is shown in FIG. 8B. The screenshot of FIG. 8B shows a second SHAREHOLDERS screen generated after the company is incorporated, showing information about share ownership in chart 1420 and information about share classes in chart 1430. Further information about particular shareholders or classes is also accessible, such a via dropdown toggles 1440.

Figure 9A:
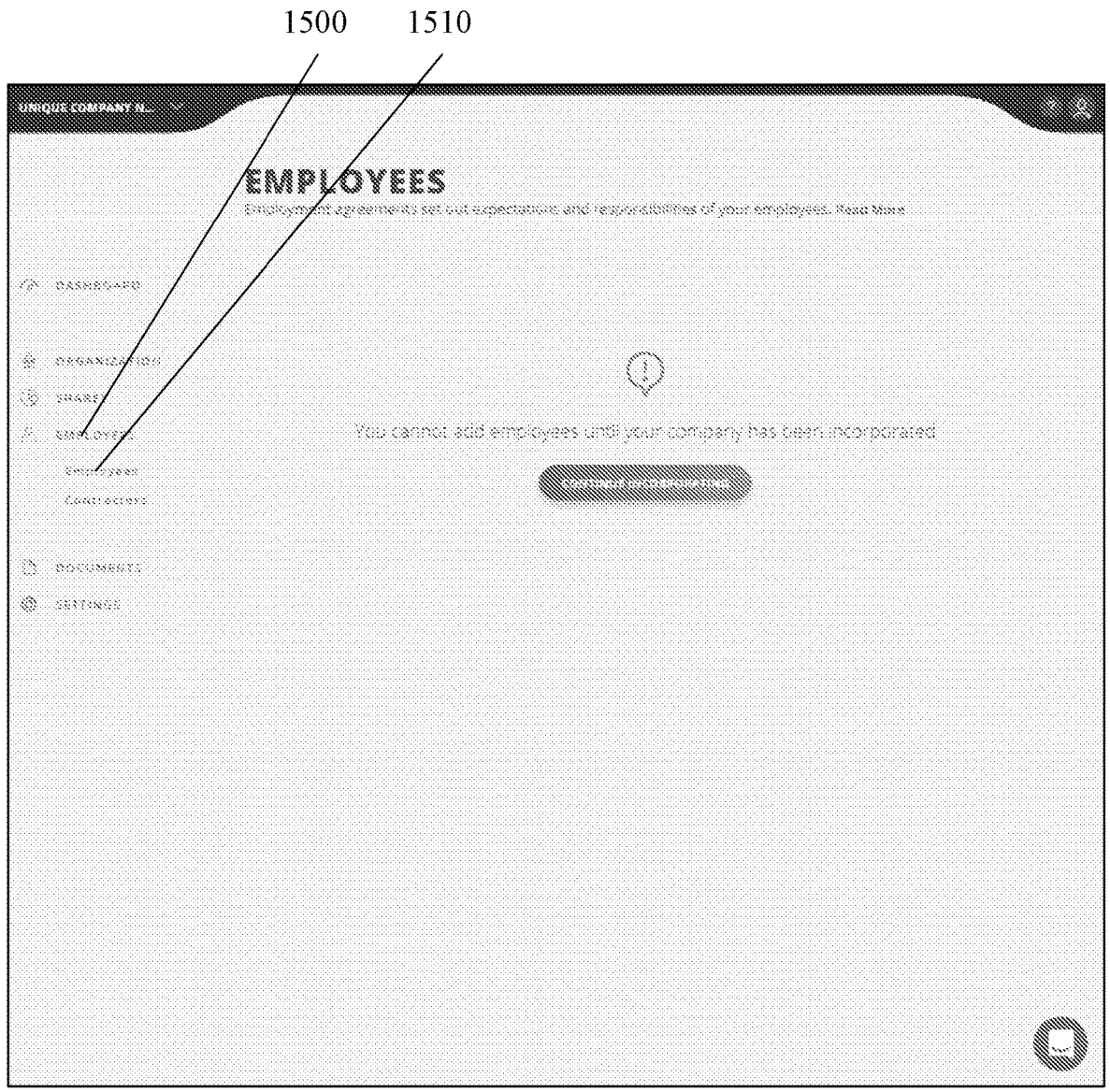
FIG. 9A shows a screenshot of a first employee information screen generated by the record management tool of FIG. 1.
Figure 9B:
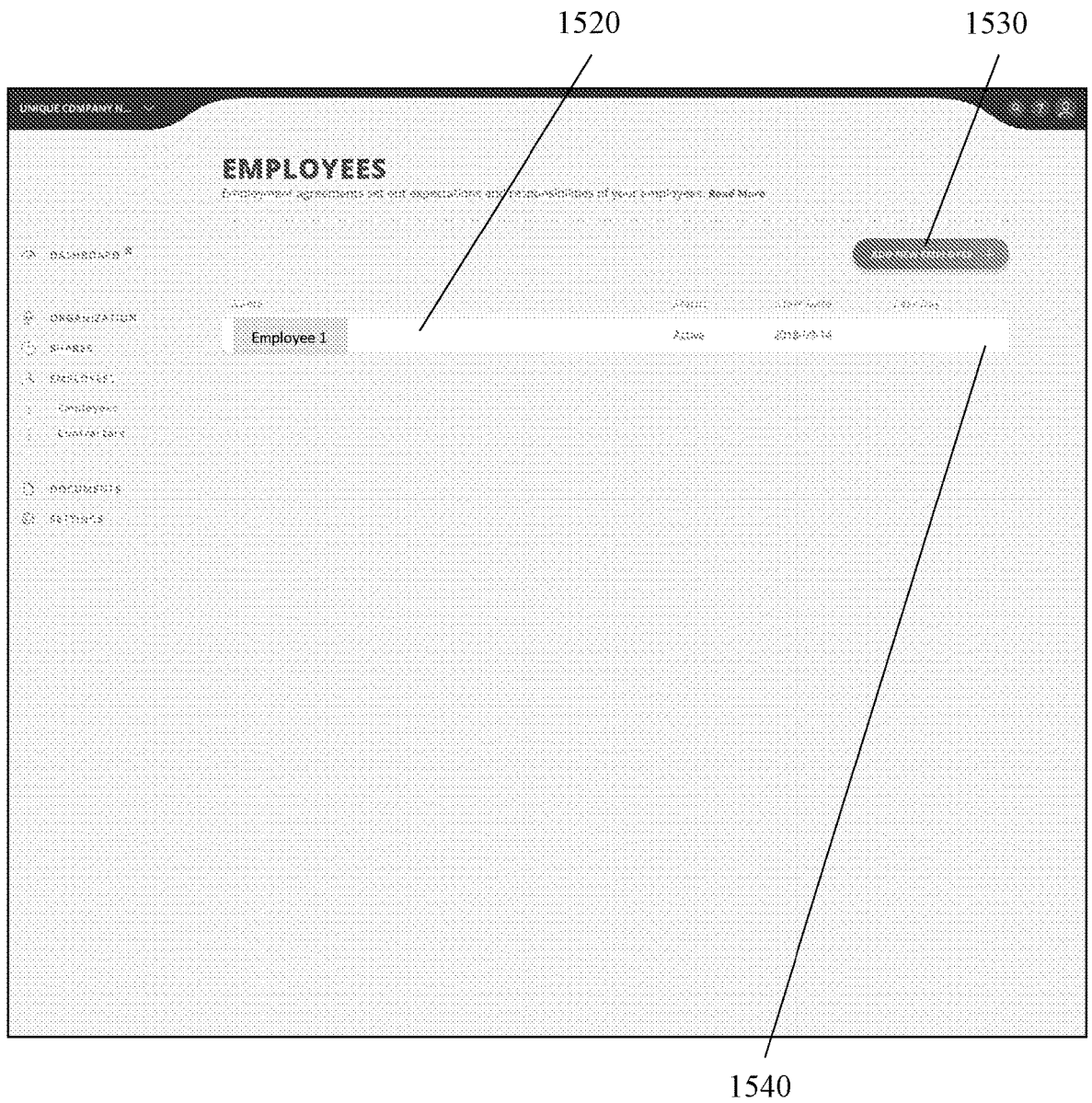
FIG. 9B shows a screenshot of a second employee information screen generated by the record management tool of FIG. 1.

FIG. 9A shows an information screen corresponding to subheading toggle 1510. Through heading toggle 1500 a user has access to employee information, including information relating to direct employees of the corporation and information relating to contractors hired by the corporation. FIG. 9A again shows the screen prior to incorporation; further information would be provided once it becomes available. For example, FIG. 9B shows a screenshot of an EMPLOYEES screen after an employee has been added. In the screenshot of FIG. 9B, an employee summary bar 1520 indicates basic information about the employee, while a toggle 1530 allows a user to access further information or take specific actions. A new employee toggle 1540 allows a user of the screen represented in FIG. 9B to add to the list of employees.

Figure 10A:
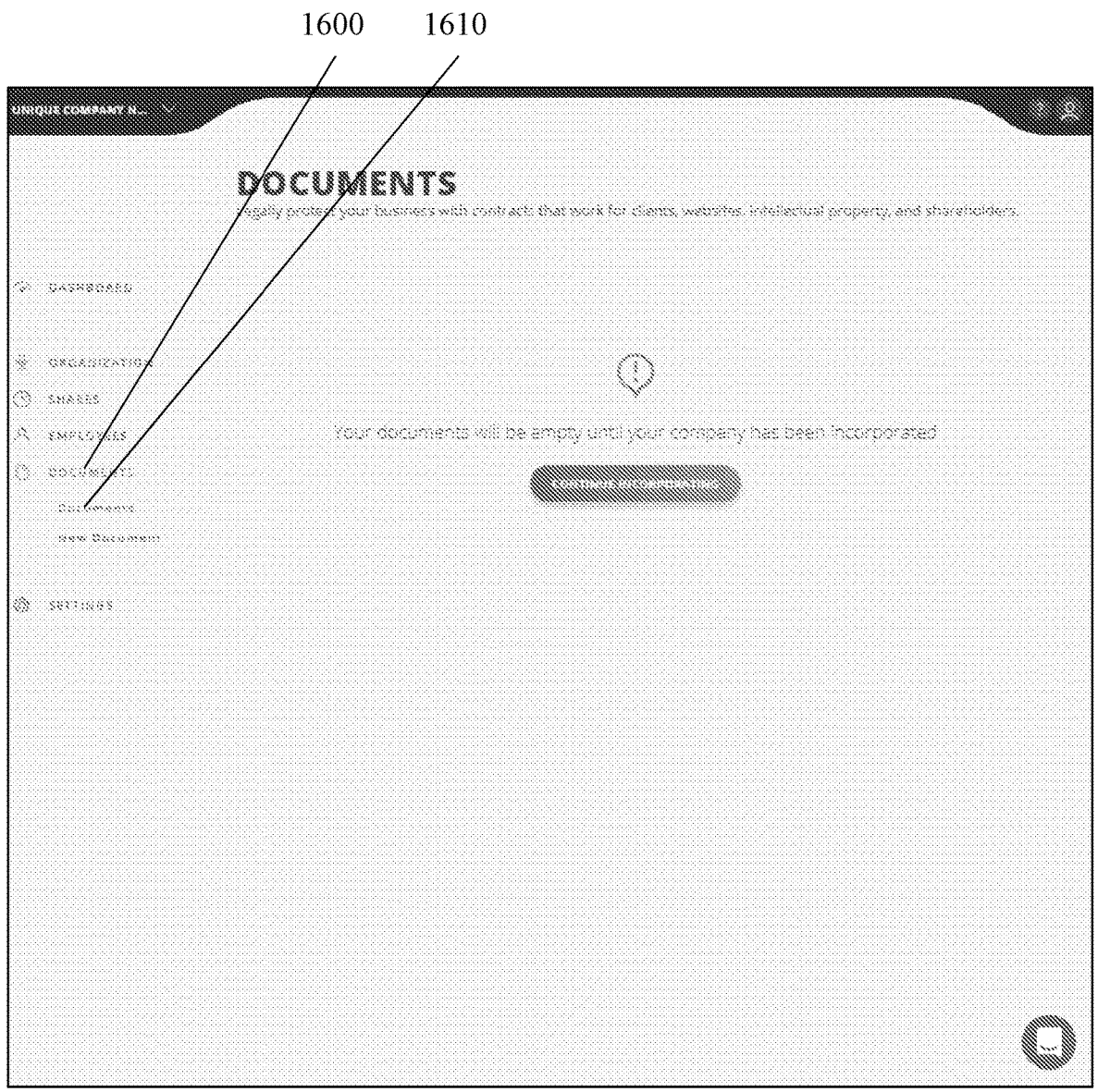
FIG. 10A shows a screenshot of a first document information and access screen generated by the record management tool of FIG. 1.

FIG. 10A shows an information screen corresponding to subheading toggle 1610. Through heading toggle 1600 a user has access to documents and other records created for the corporation, such as documents created by a record bank module, documents retrieved from outside the system such as from incorporation authorities, and documents uploaded to the system by a user. The user is provided with access to the documents and with the option of creating new documents. FIG. 10A again shows the screen prior to incorporation; following incorporation the screen will provide access to at least the essential incorporation documents, and, as the company develops, other corporation-related documents such as employment agreements, contractor agreements, shareholder agreements, and others.

Figure 10B:
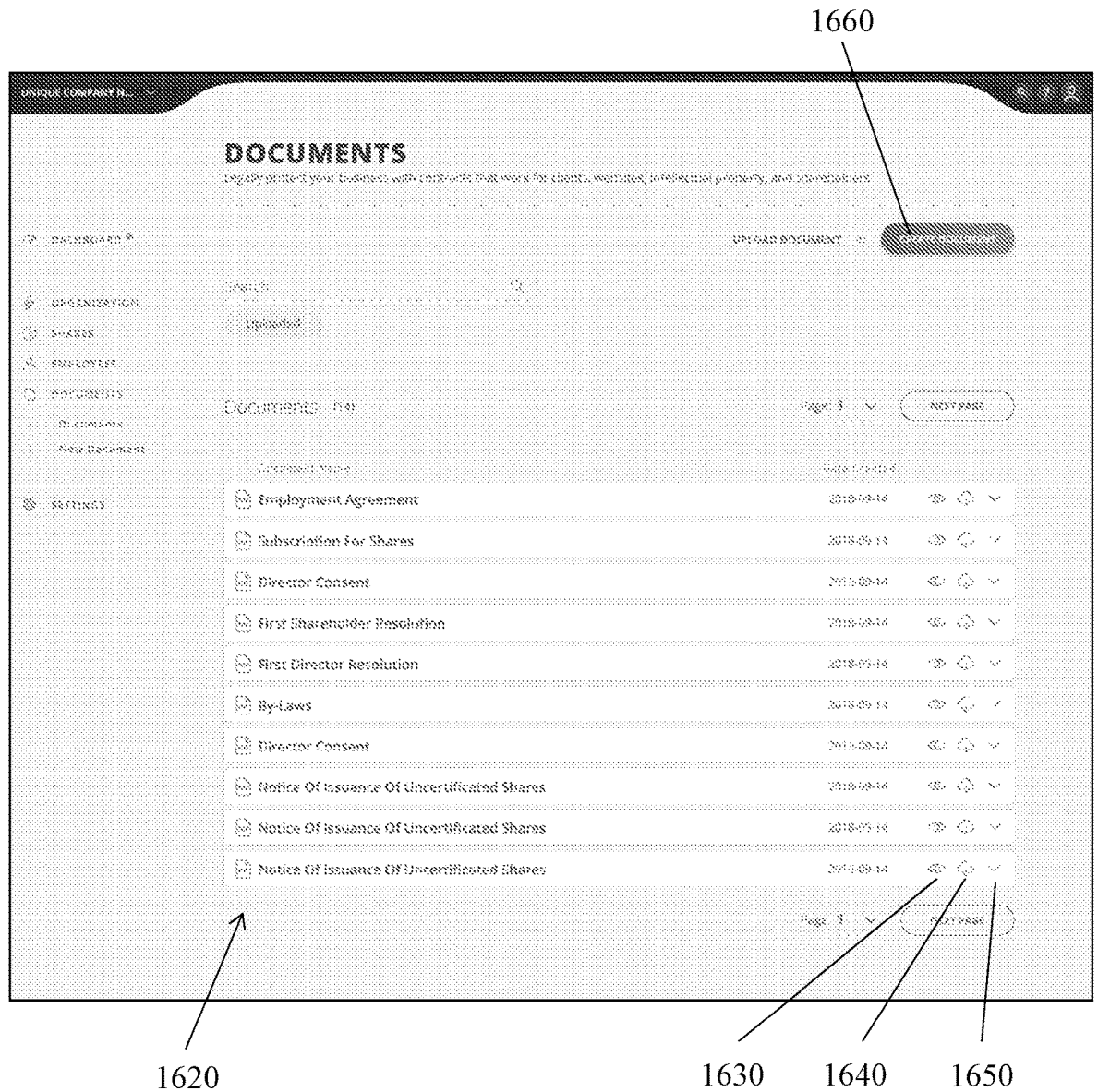
FIG. 10B shows a screenshot of a second document information and access screen generated by the record management tool of FIG. 1.

FIG. 10B shows a screenshot of a DOCUMENTS screen after incorporation. The screenshot of FIG. 10B shows a listing of documents 1620, each list entry providing the user with the options of viewing the document, downloading the document, or accessing further details about the document, via toggles 1630, 1640, and 1650, respectively. The screenshot of FIG. 10B also includes a toggle 1660 for use by a user in creating a new document.

Figure 10C:
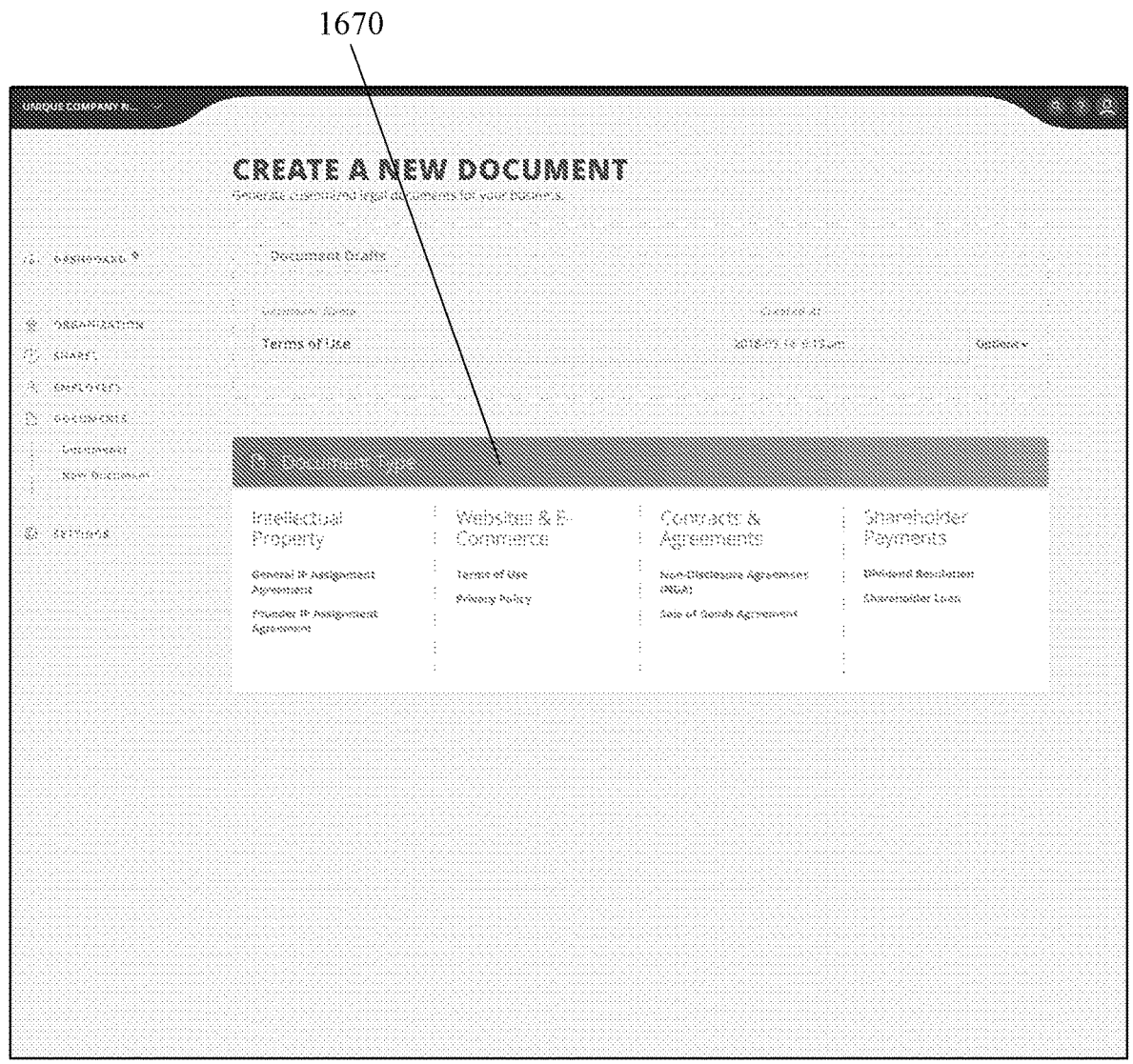
FIG. 10C shows a screenshot of a new document creation screen generated by the record management tool of FIG. 1.

FIG. 10C shows a screenshot of a CREATE NEW DOCUMENT screen accessed via toggle 1660. In the CREATE NEW DOCUMENT screen, a user is presented with a number of document type options via interface 1670. From interface 1670 the user may select a document to create. Selecting a document from interface 1670 results in a template being accessed and combined with available information to create a document base. A user may customize the document and have the document finalized and made ready for signatures or added directly to the listing of documents, depending on the type of document and the user's permissions. In some embodiments, document templates or other record templates are linked to a set of corporate-specific logic, such as through a logic module, and the set of corporate-specific logic both applies existing rules to the creation of records and updates rules in response to choices or actions taken by a user or detected by the system.

Figure 11A:
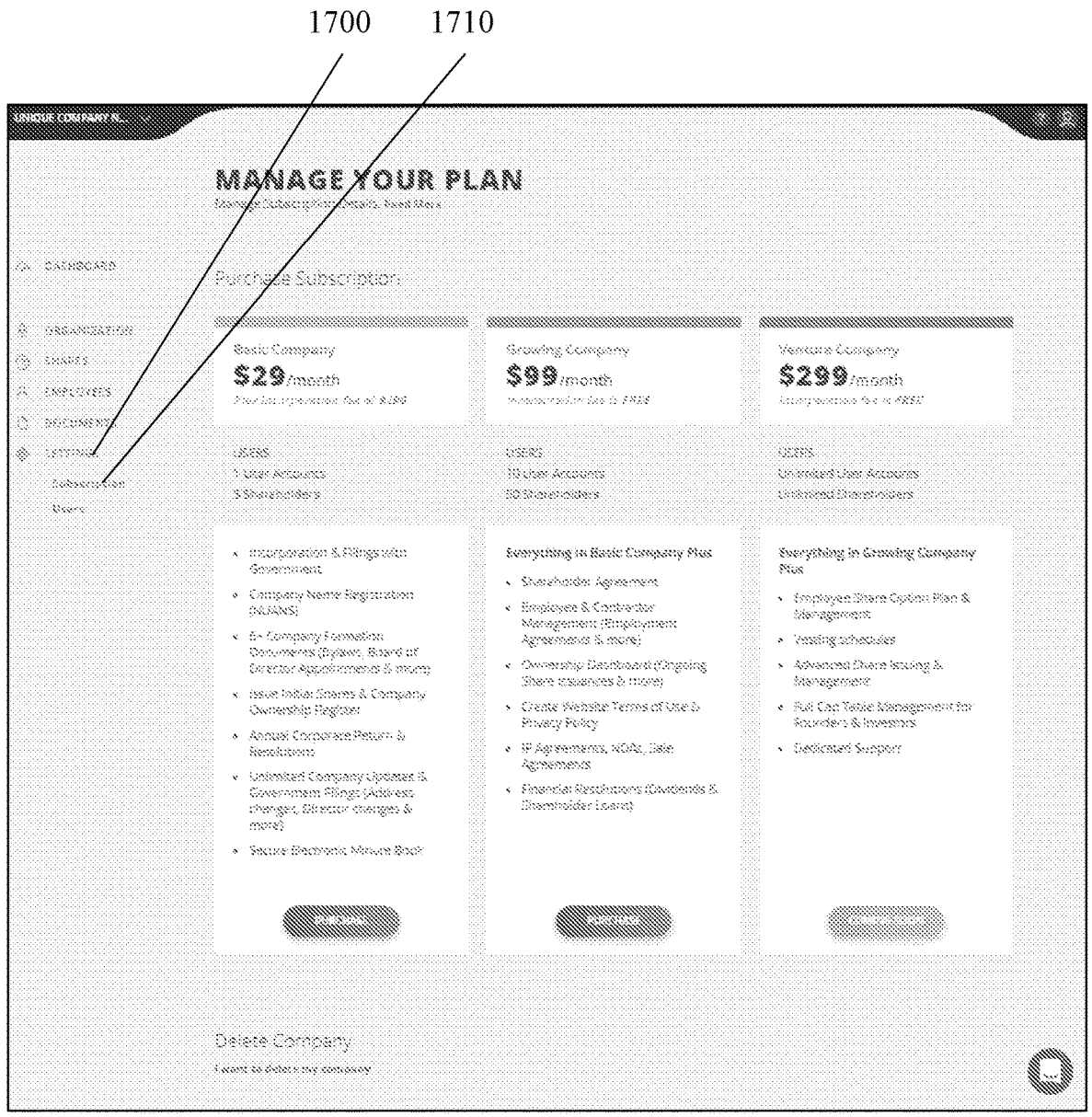
FIG. 11A shows a screenshot of a first subscriptions screen generated by the record management tool of FIG. 1.

FIG. 11A shows an information screen corresponding to subheading toggle 1710. Through heading toggle 1700 a user has access to settings, including subscription options and user settings. As the system indicated by FIGS. 1 to 20 operates on a subscription model, a user is provided with the option of selecting a subscription option. In some embodiments, such as the embodiment corresponding to FIGS. 1 to 20, a subscription-based billing model is preferred to a pay-per-use or other billing model.

Figure 11B:
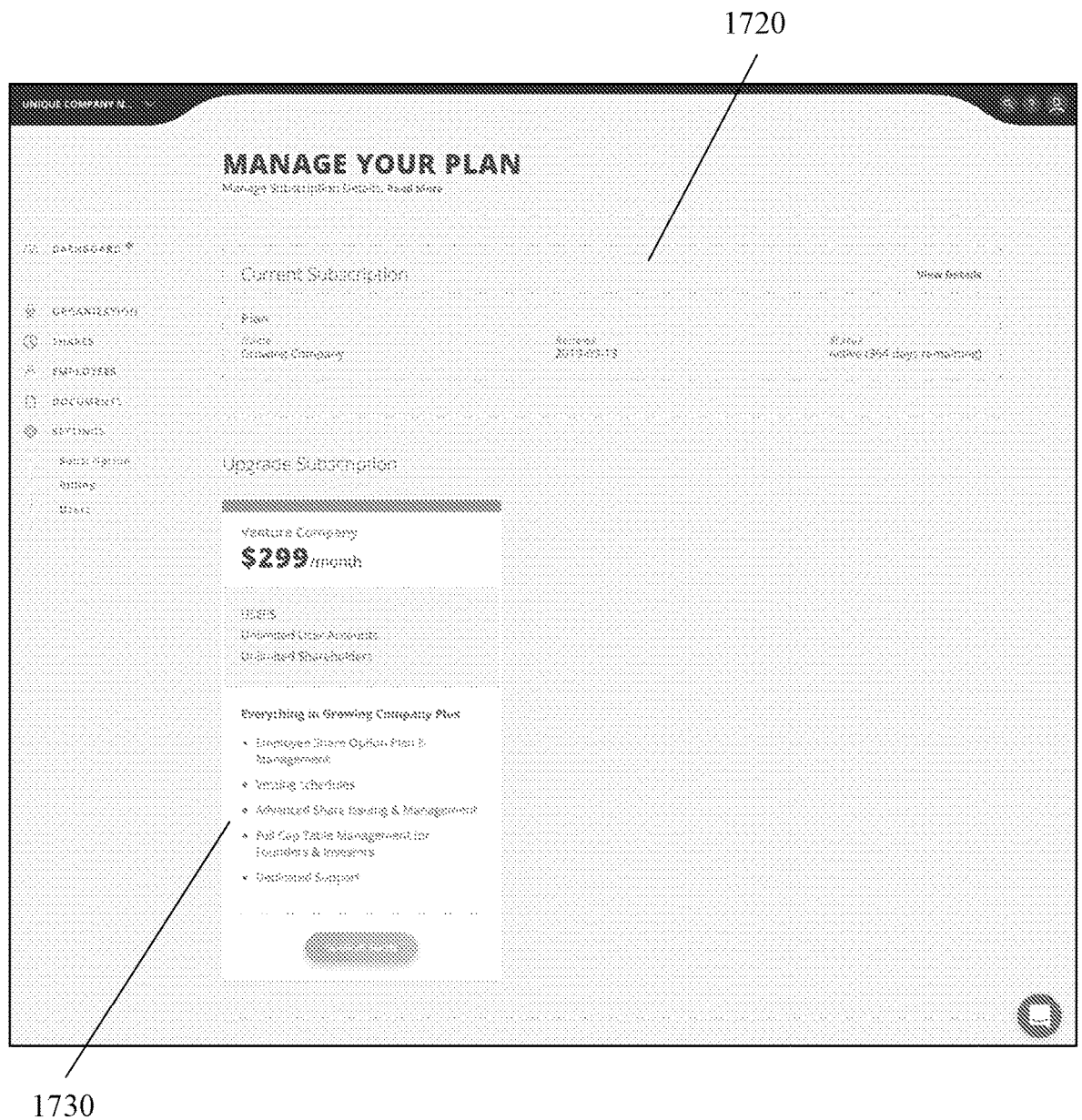
FIG. 11B shows a screenshot of a second subscriptions screen generated by the record management tool of FIG. 1.

FIG. 11B shows a screenshot of a MANAGE YOUR PLAN screen, providing the user with options specific to their subscription plan. The MANAGE YOUR PLAN screen of FIG. 11B provides the use with a summary of their subscription in box 1720 and with information about the next subscription upgrade in box 1730.

In some embodiments, the tool includes a record bank module to create and maintain records, a corporate logic module to verify completeness of documents and upcoming deadlines and legal tasks, and an AutoClerk module to interface with third parties such as government authorities. In some embodiments, an AutoClerk module does not submit documents to an incorporation authority, such as Corporations Canada, unless payment has been received. In some embodiments, a user does not have access to the documents stored by the system or to some other set of features made available by the system unless they are paying for a subscription or a specific subscription tier. In some embodiments, a combination of subscription tier and account type determines the features made available to the user, the authority the user has to create and finalize documents, and the amount of information made available to the user.

Settings options may also allow a user to create or delete other user accounts or change access settings and settings relating to what other users are expected to contribute. For example, in some embodiments a system may offer different categories of user accounts, such as professional accounts and corporate accounts. Professional accounts may be designed for use by professionals, such as in-house or external legal counsel, accounting professionals, or others. Corporate accounts may be designed for use by executives, directors, owners, or employees of a corporation to allow them to access and manage their information and records. In some embodiments, corporate users may be permitted to change and update certain details, while professional users may be permitted to change and update other details and review and approve details inputted by other users, and common details may be changed and updated by both professional or corporate users. In some embodiments, certain changes by corporate users may not take effect unless approved by one or more professional users. For example, in some system embodiments the system may permit a corporate user to create a document but may require that the document be reviewed and approved by a professional user before it is finalized and ready to be signed, such as the embodiment corresponding to the ALL COMPANIES professional user dashboard of FIG. 20F. Within categories, different users may be granted different permissions and different accounts may be set up to receive different notices and prompts. For example, if the system detects that an application for incorporation had been granted by a third-party incorporation authority, in some configurations or embodiments a system may send a notice to an external legal counsel user and prompt a corporate director user for a piece of information such as a signature on a relevant document, without sending notices or prompts to any other professional or corporate users.

Figure 12B:
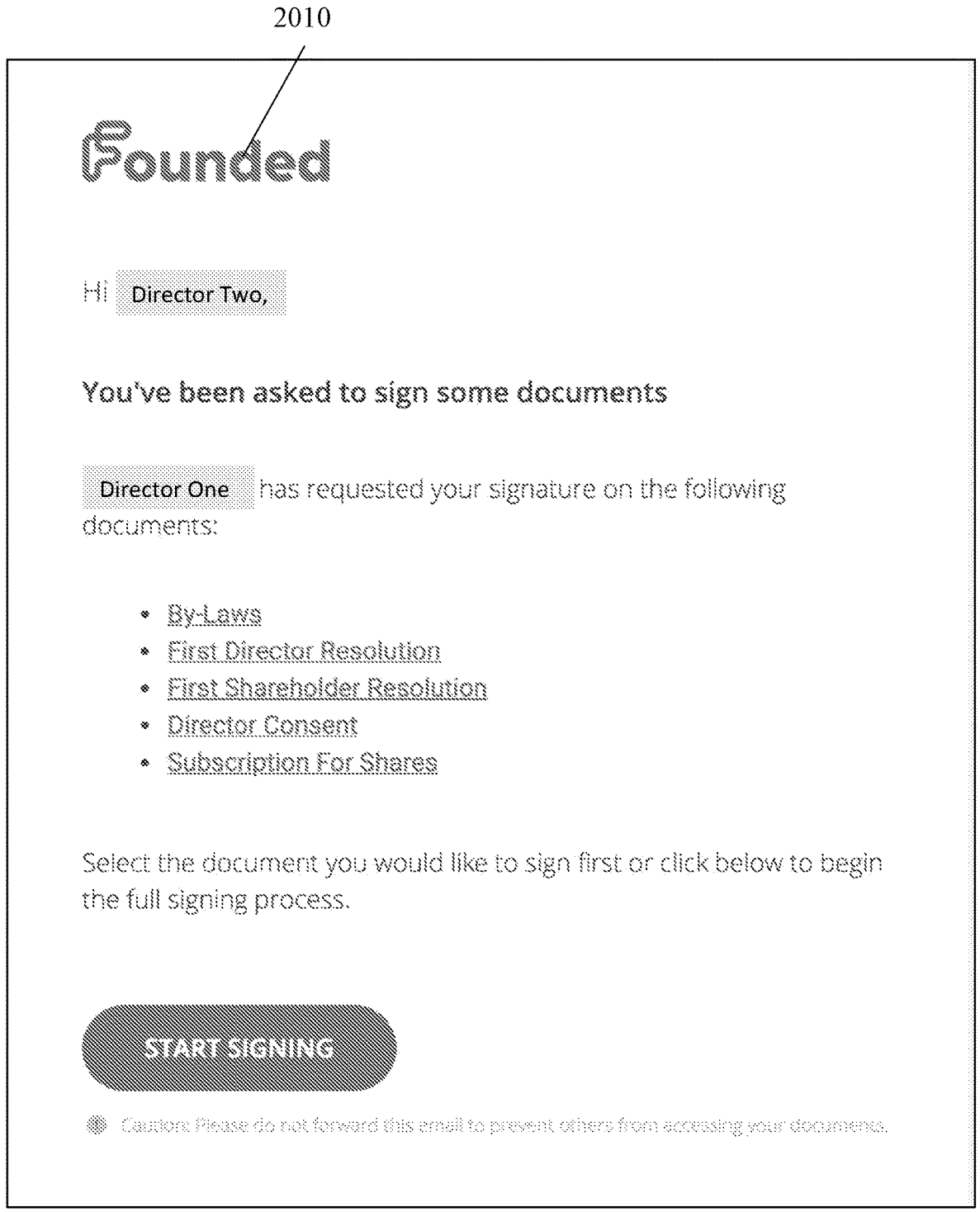
FIG. 12B shows a screenshot of a second prompt generated by the record management tool of FIG. 1.

FIG. 12A depicts an example of a prompt sent to a director user by the system, triggered by the system detecting that a request for incorporation was granted by a third-party incorporation authority. Prompt 2000 may be sent, for example, by email. In the example prompt 2000 indicated in FIG. 12A, 'director two' is prompted to provide six pieces of information. In some embodiments, signatures on important documents or other records will be added to the collection of foundational information maintained by a system. Prompt 2000 asks director two to provide a signature on each of six documents. As depicted in FIG. 12B, a prompt may also include branding information such as logo 2010.

In the example embodiment represented by FIGS. 1 to 20, the system is configured to automatically generate several documents in response to receiving a notice that an incorporation authority has approved a request for incorporation. These documents embody initiating information received from an initiating user, the initiating information collected prior to sending the request for incorporation to the incorporation authority. For example, documents created include a document of corporate by-laws, a first director resolution, a first shareholder resolution, one or more director consent documents, a notice of issuance of uncertificated shares, and a subscription for shares document. These documents are created by the system from framework or template information utilizing, in part, the corporate logic module, populated with existing information available to the system, and stored. If information for the completion of the documents, such as certain signatures, corporate details, or other information, the system also proceeds to gather the missing information, such as via prompts like prompt 2000, parsing of other documents, or scraping of incorporation authority websites or other sources of information.

When a signature is needed, and a signature provider has accessed the system to provide the necessary signature, the signature provider is presented with a signature subinterface as represented by FIGS. 13 to 19.

The signature subinterface of the system represented by FIGS. 1 to 20 provides a user with a view control 2100, giving the user the option of viewing the full document via toggle 2300 and viewing a summary of the document via toggle 2200.

Figure 13:
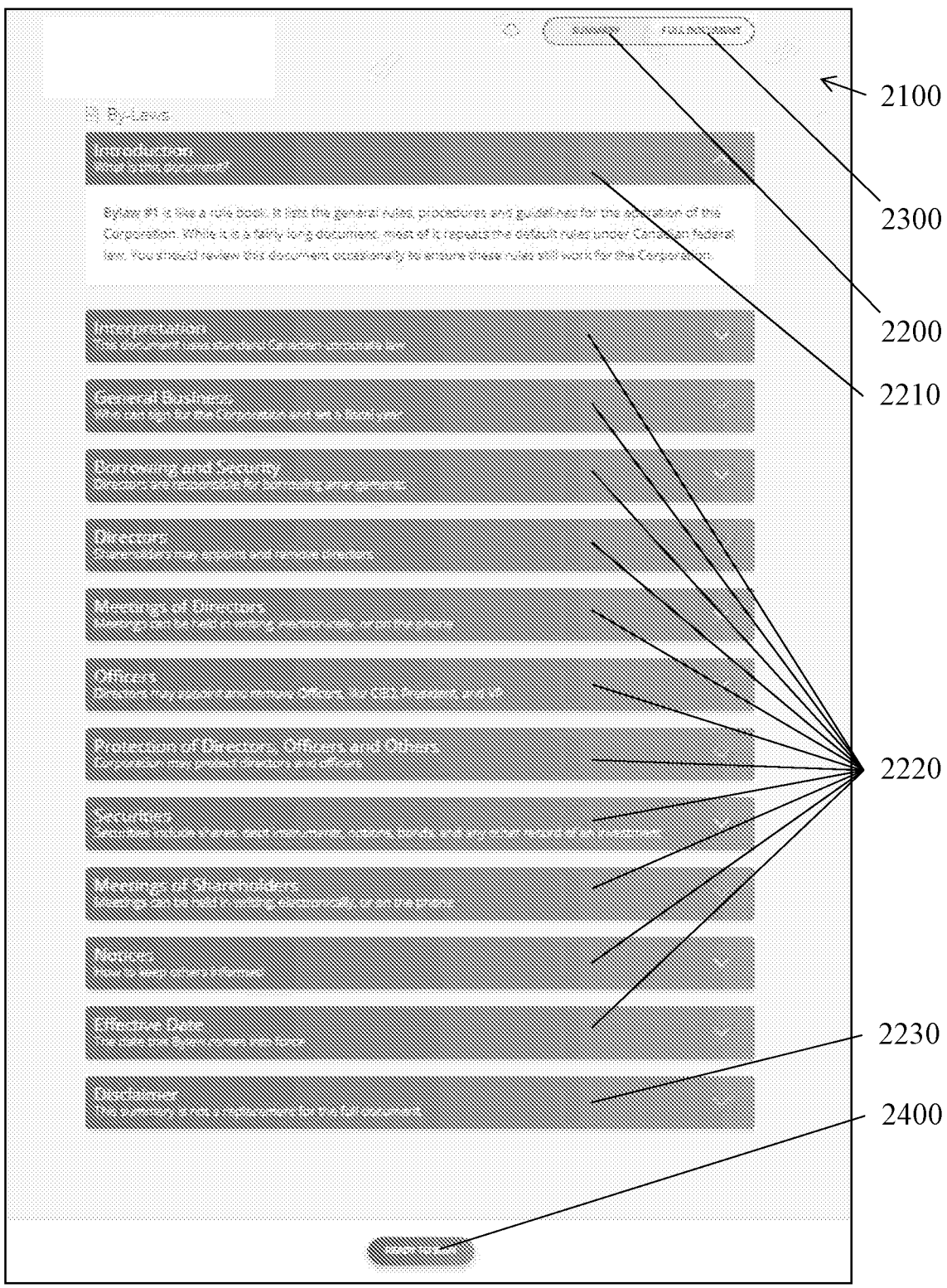
FIG. 13 shows a screenshot of a first document summary view screen generated by the record management tool of FIG. 1.

Operating in a summary view, the user is presented with access to a brief introduction to the document via introduction box 2210, summaries of the various sections of the document via content boxes 2220, and a notice that the summary is provided for reference only and that the signature provider should still consult the full document via disclaimer box 2230, as indicated in FIG. 13. The user is provided with summaries of the content of the document, which summaries may include comments about the desirability of the content or revisions to the content in some embodiments.

Figure 14:
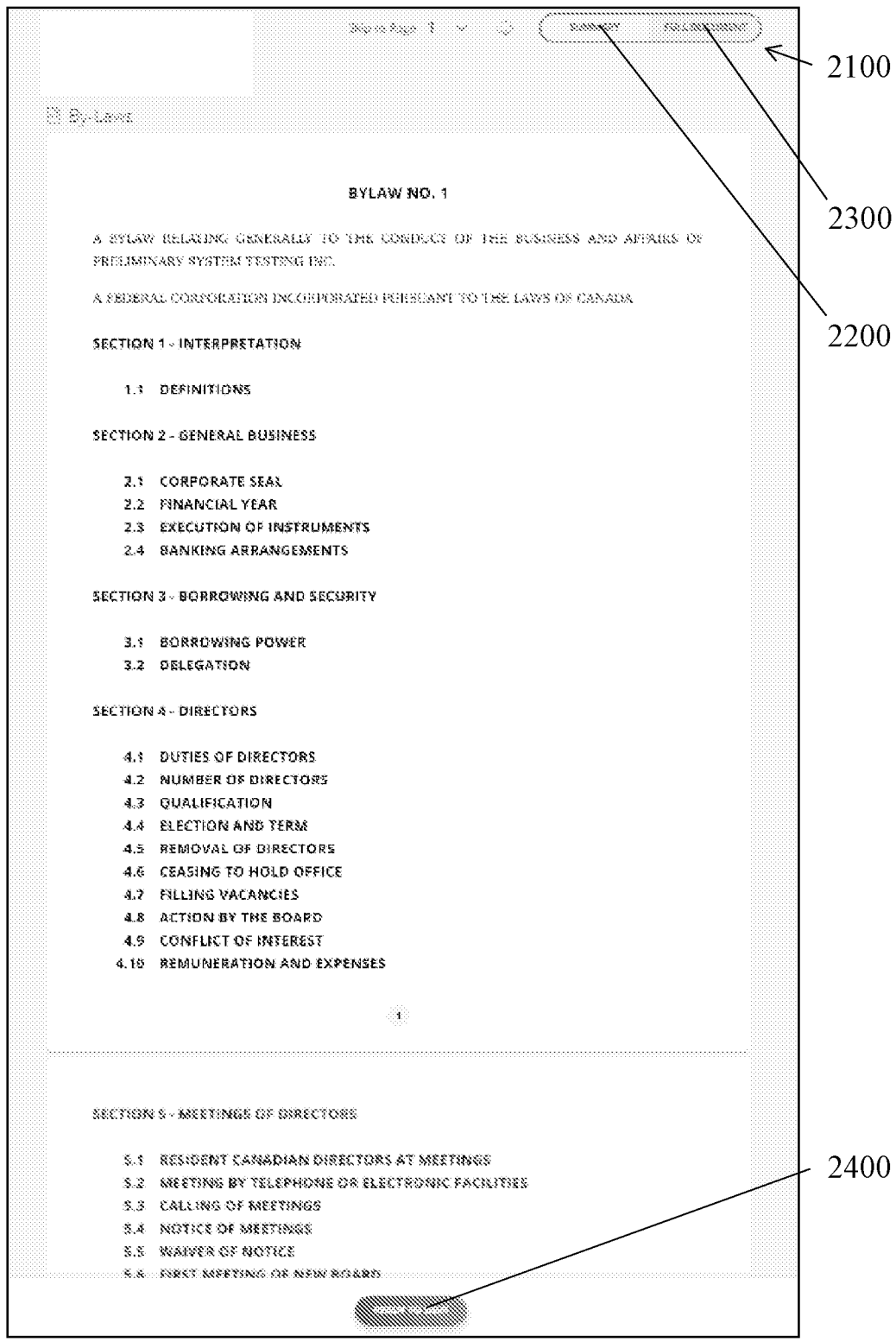
FIG. 14 shows a screenshot of a first document full view screen generated by the record management tool of FIG. 1.

Operating in a full document view, the user is presented with the document itself, as indicated in FIG. 14. In some embodiments, a full document view may also provide the user with comments or information or advice about the document.

When the user is ready, they may select a signature toggle 2400 and be presented with a signature entry options control 2410. In some embodiments the signature toggle is available in either summary or full document view and is available right away. However, in other embodiments restrictions are implemented; for example, in some embodiments the signature toggle is only available when the user has at least scrolled through the entire document in a full document view.

Figure 15:
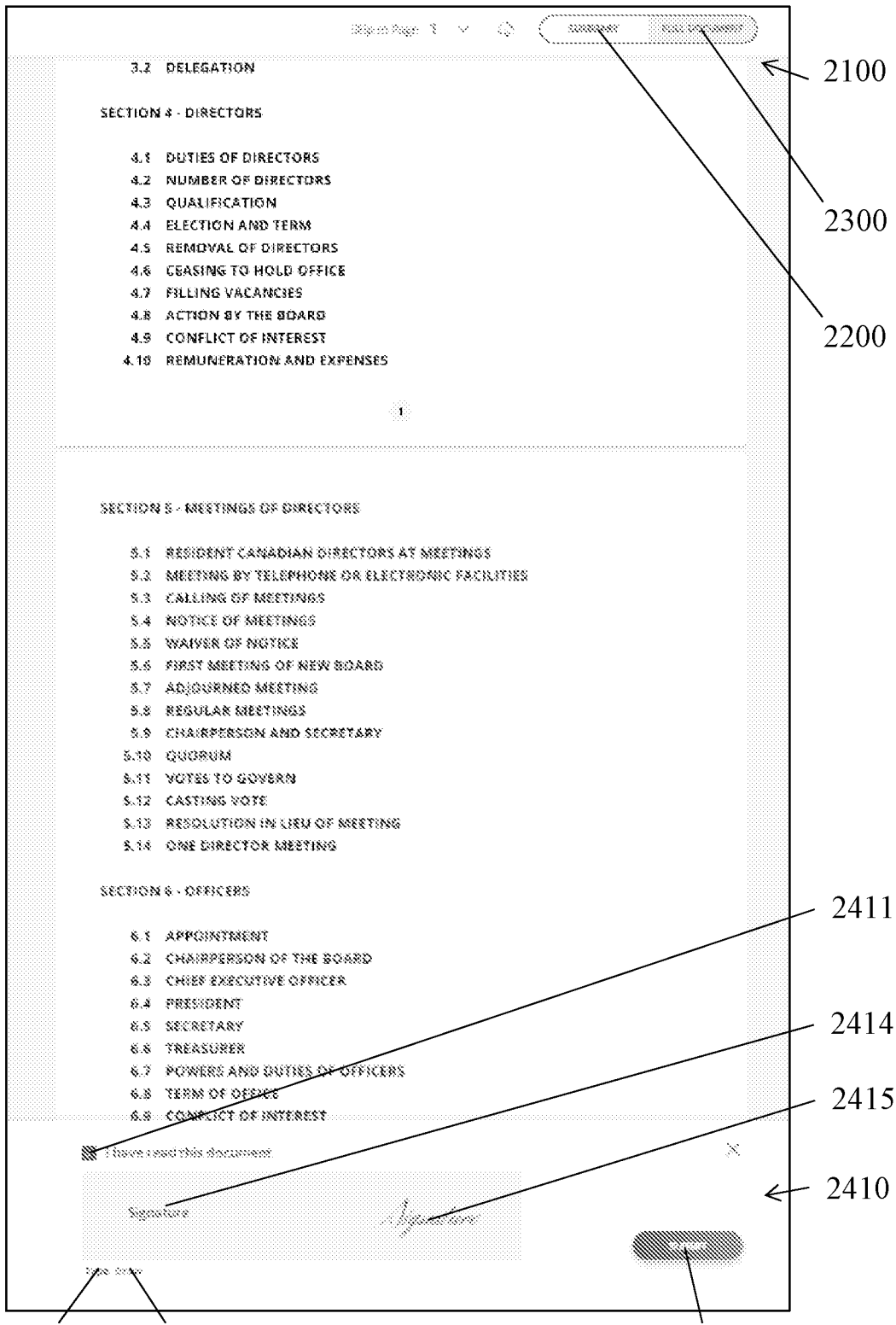
FIG. 15 shows a screenshot of the document full view screen of FIG. 14 with a signature entry options control expanded.

When the user has triggered the signature toggle 2400 and been presented with signature entry options 2410, they are asked to indicate that they have read the full document via checkbox 2411, and then may choose either to type out their signature via toggle 2412 or to draw their signature via toggle 2413. FIG. 15 indicates signature entry options 2410 in which a user has chosen to type their signature; the user types out their signature in entry box 2414 and is shown how it will appear on the document via display box 2415.

Figure 16:
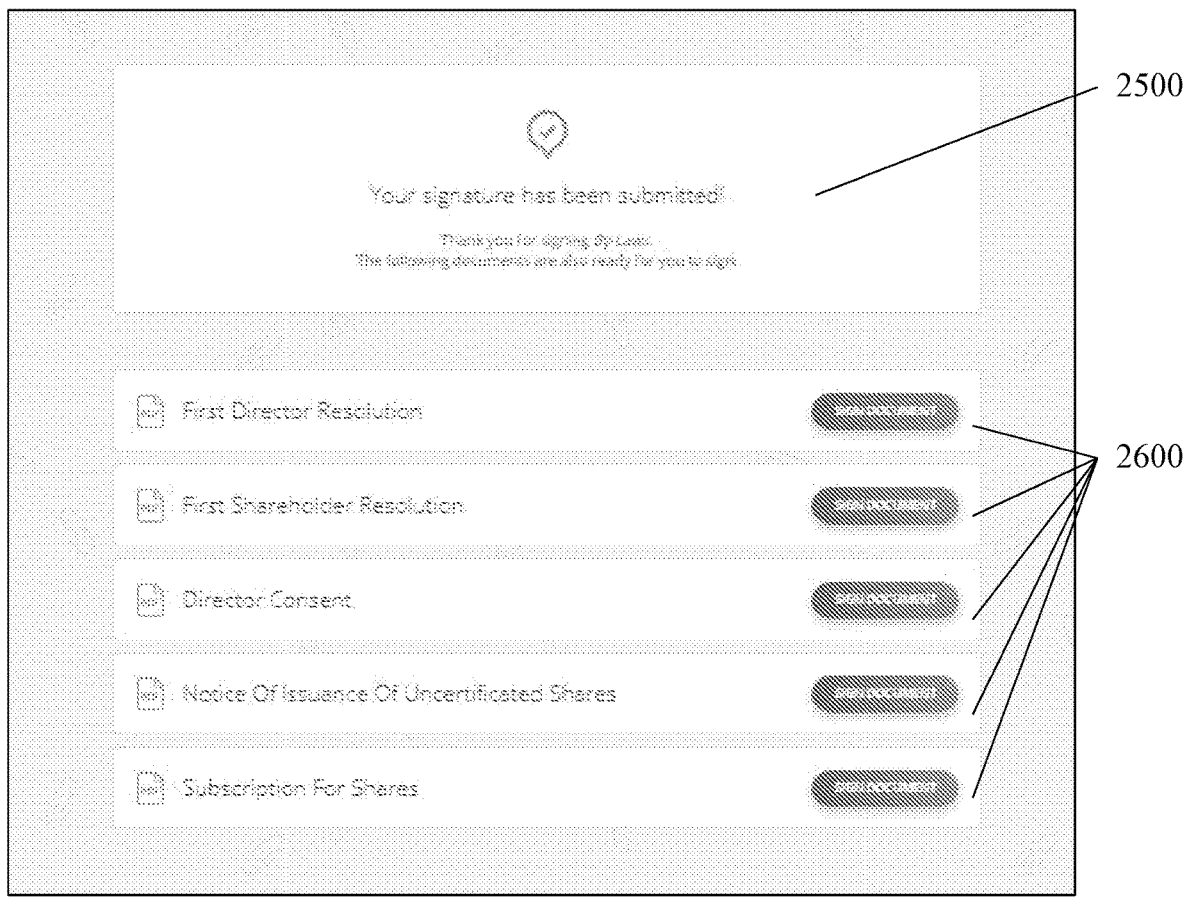
FIG. 16 shows a screenshot of a signature submission confirmation screen generated by the record management tool of FIG. 1.

Once the user has finished signing the document, they may submit the document via toggle 2416. When a document has been submitted, the user is presented with confirmation notice 2500 as shown in FIG. 16. Where further information is required from the user, they are also prompted to continue by providing the further information, via notices 2600 of FIG. 16.

Figure 17:
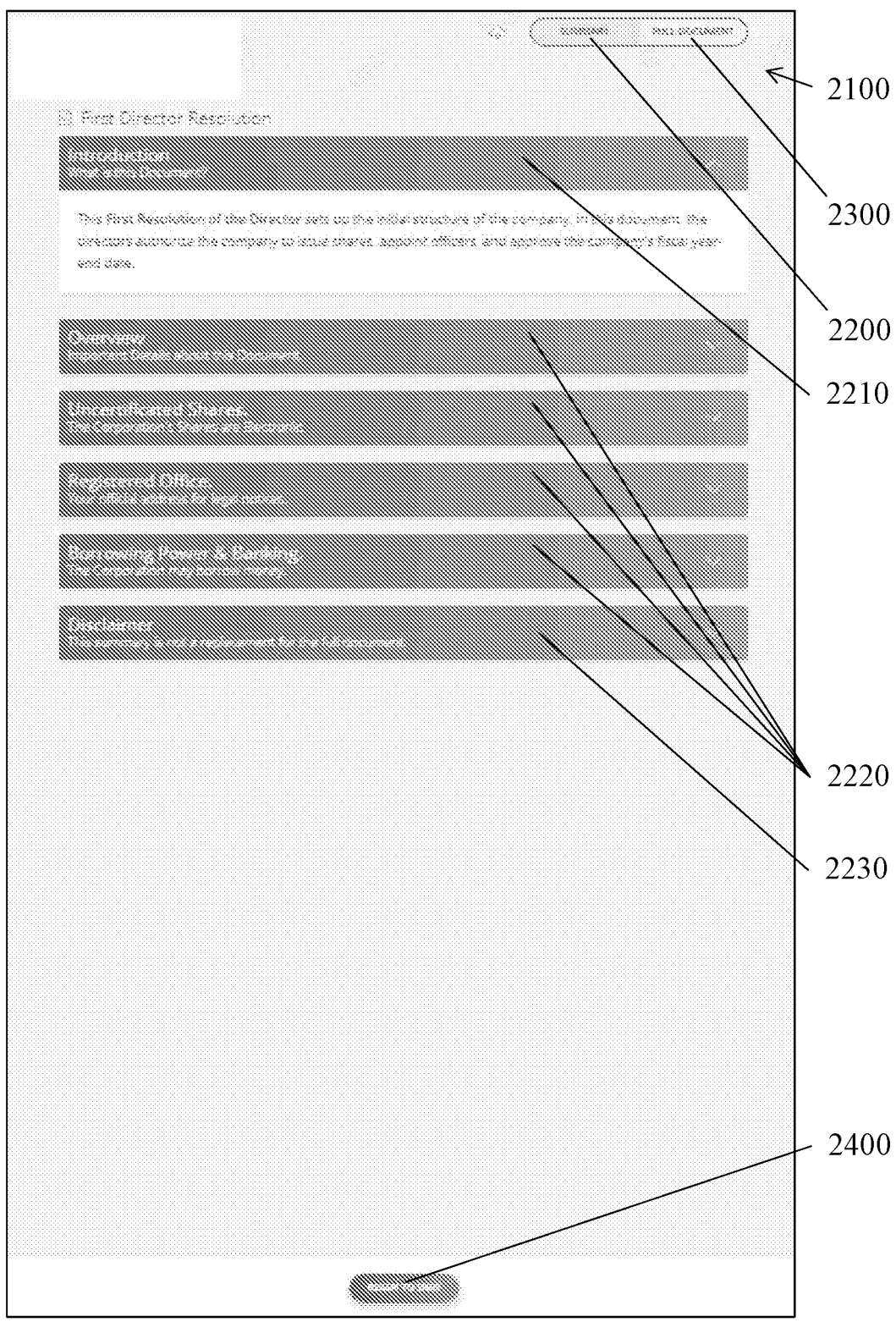
FIG. 17 shows a screenshot of a second document summary view screen generated by the record management tool of FIG. 1.
Figure 18:
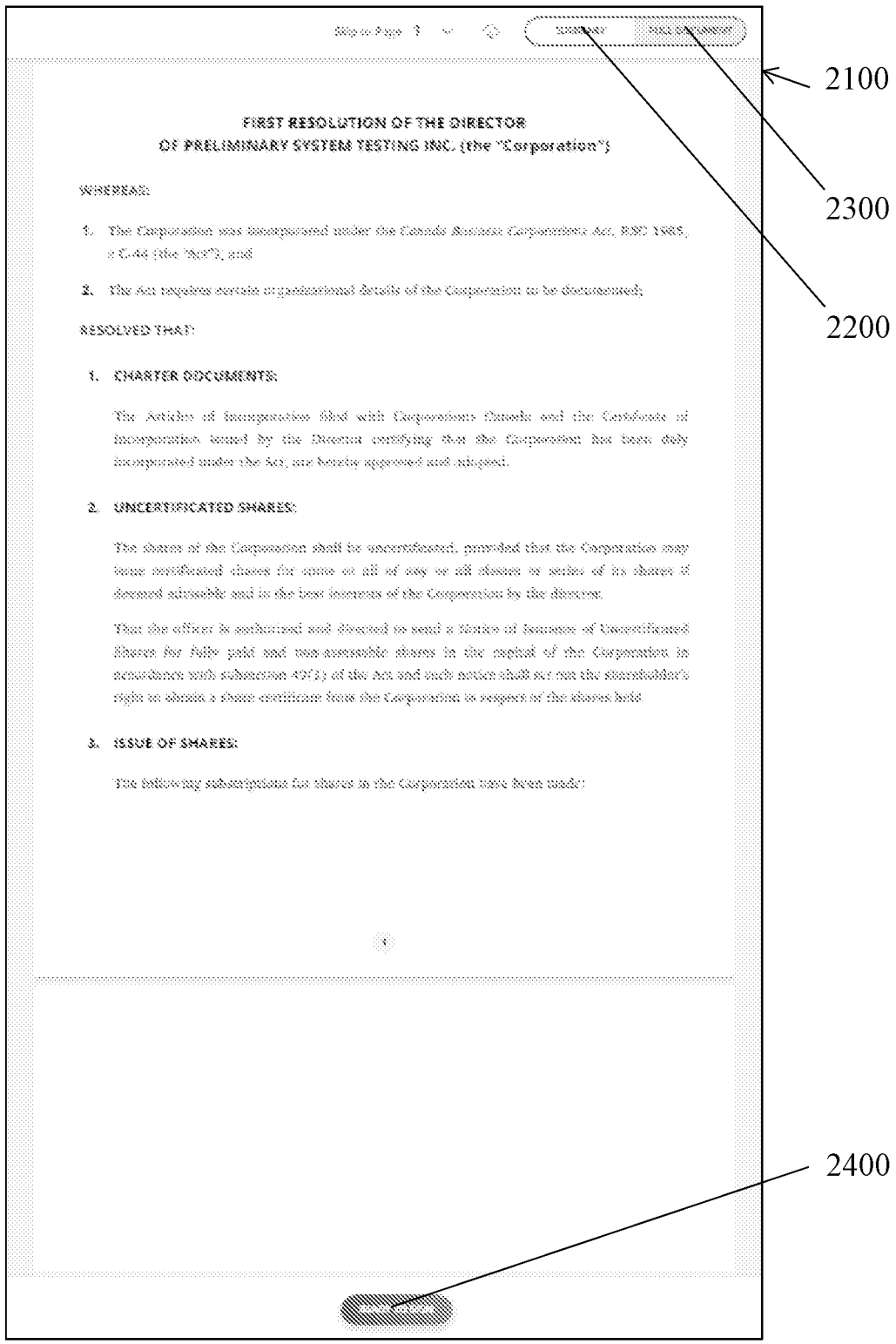
FIG. 18 shows a screenshot of a second document full view screen generated by the record management tool of FIG. 1.

As indicated in FIG. 17, a user may then proceed to review and sign a further document. FIG. 17 depicts a summary view of a First Director Resolution document. Again, the user has access to toggles 2200 and 2300 of controls 2100 and is presented with an introduction to the document in box 2210, summaries of sections of the document in boxes 2220, and a disclaimer in box 2230. The user is also provided with the option of signing the document, via toggle 2400. As indicated in FIG. 18, the user has the option of switching to a full document view via toggle 2300.

Figure 19:
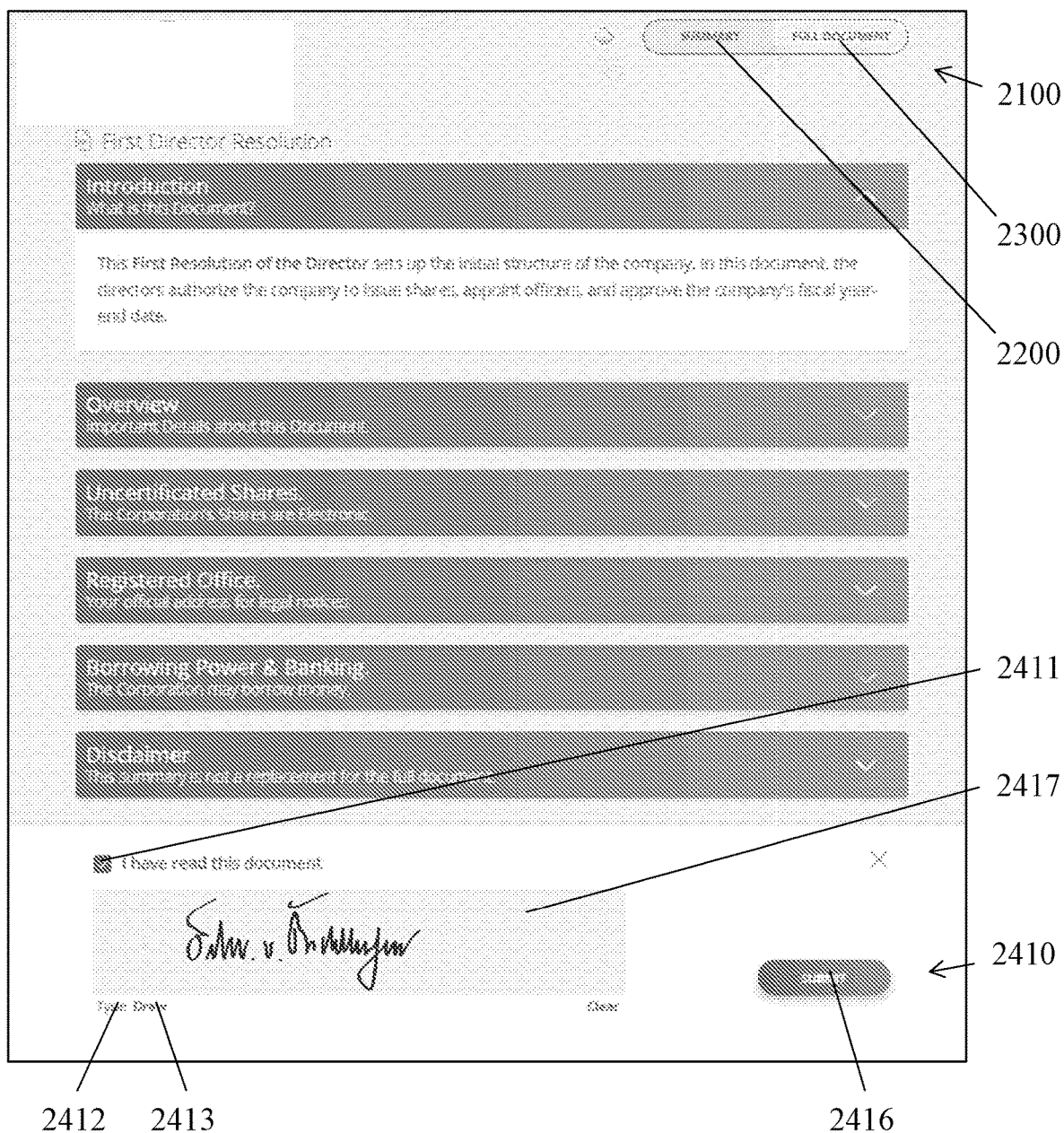
FIG. 19 shows a screenshot of the document summary screen of FIG. 17 with a signature entry options control expanded.

When ready to sign, the user may choose to sign using the draw function of the signature entry options, as indicated in FIG. 19, and may proceed to draw a signature in signature box 2417.

Figure 20A:
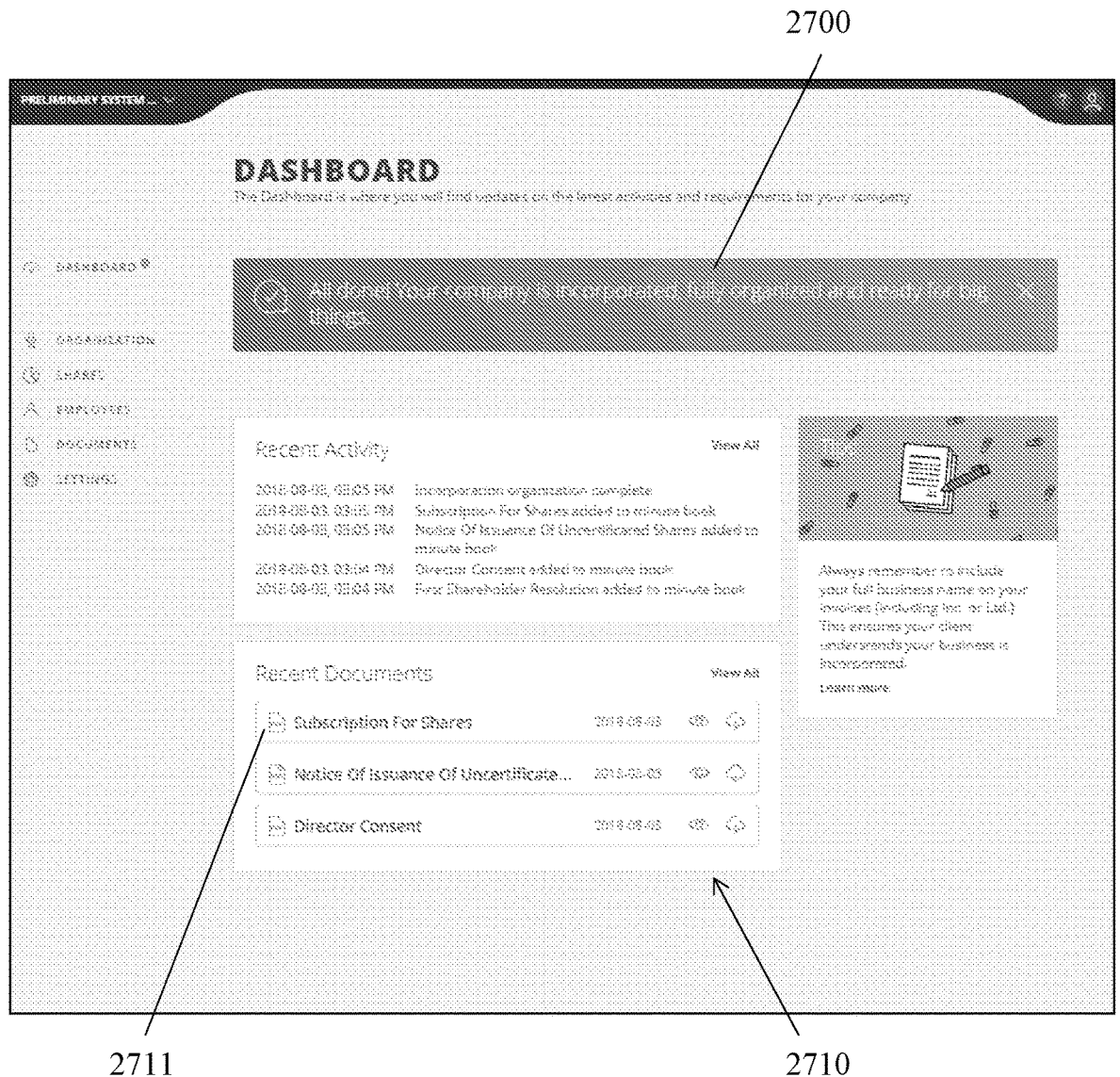
FIG. 20A shows a screenshot of a second dashboard screen generated by the record management tool of FIG. 1.
Figure 20B:
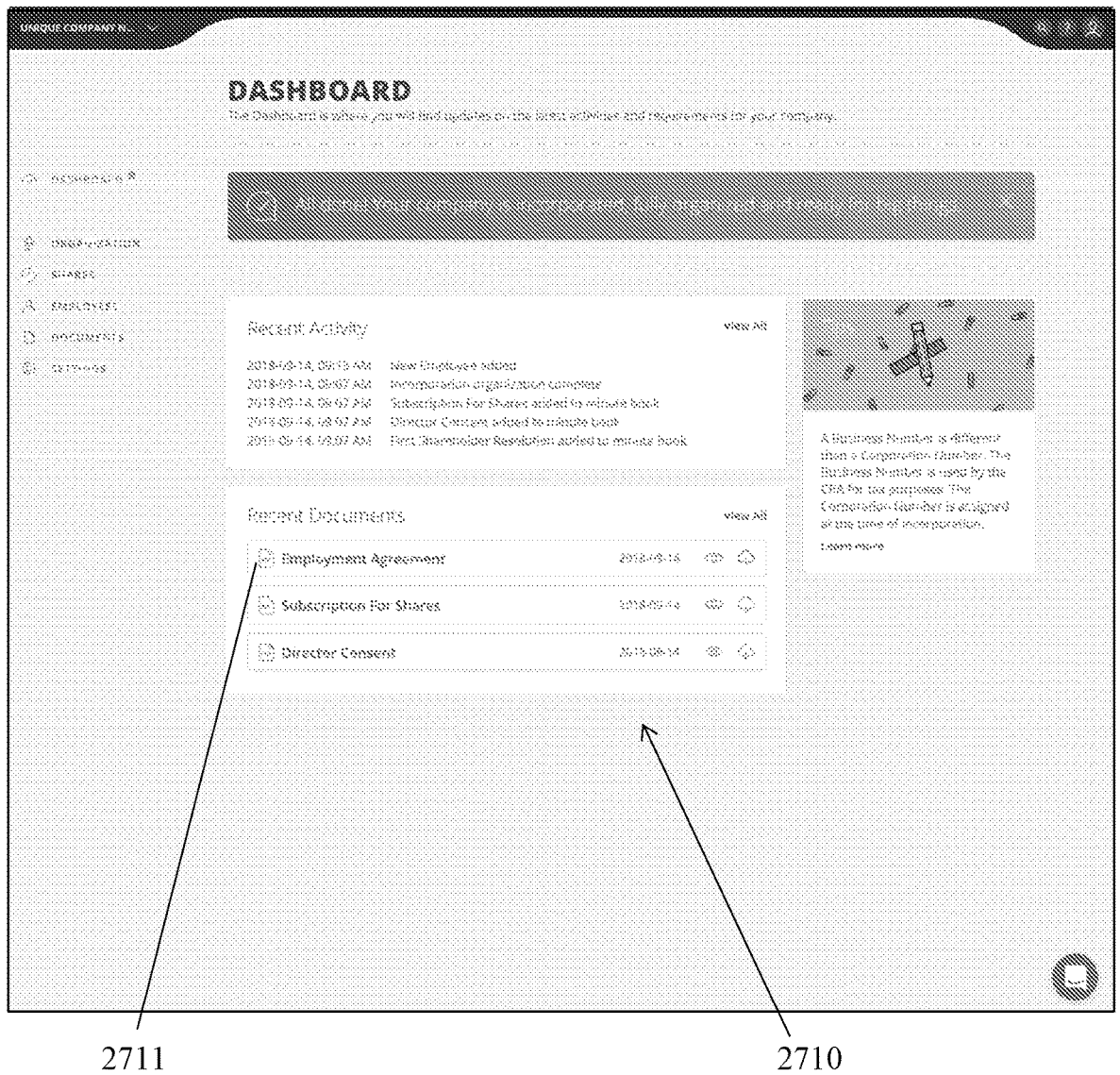
FIG. 20B shows a screenshot of a third dashboard screen generated by the record management tool of FIG. 1.

FIG. 20A shows a dashboard screen indicating via comment 2700 that the incorporation stage of the company is complete. Such messages may include notices that incorporation is complete, notices that tax filings are due, or other notices of significant corporate events. Such messages may be triggered by the detection of events, such as the detection that all necessary signatures and other foundational information has been collected and added to the collection of foundational information, the detection by an AutoClerk module of a notice from a government of action needed, or the detection that the corporation's year end is approaching. As indicated in listing 2710, a user is presented with information about recent activity. In the listing 2710 of the screenshot of FIG. 20A, the user is notified via top box 2711 that the most recent document created was a Subscription for Shares. As shown in FIG. 20B, the dashboard screen is updated as further actions are taken. The screenshot of FIG. 20B shows via top box 2711 that the most recent document created was an Employment Agreement.

Figure 20C:
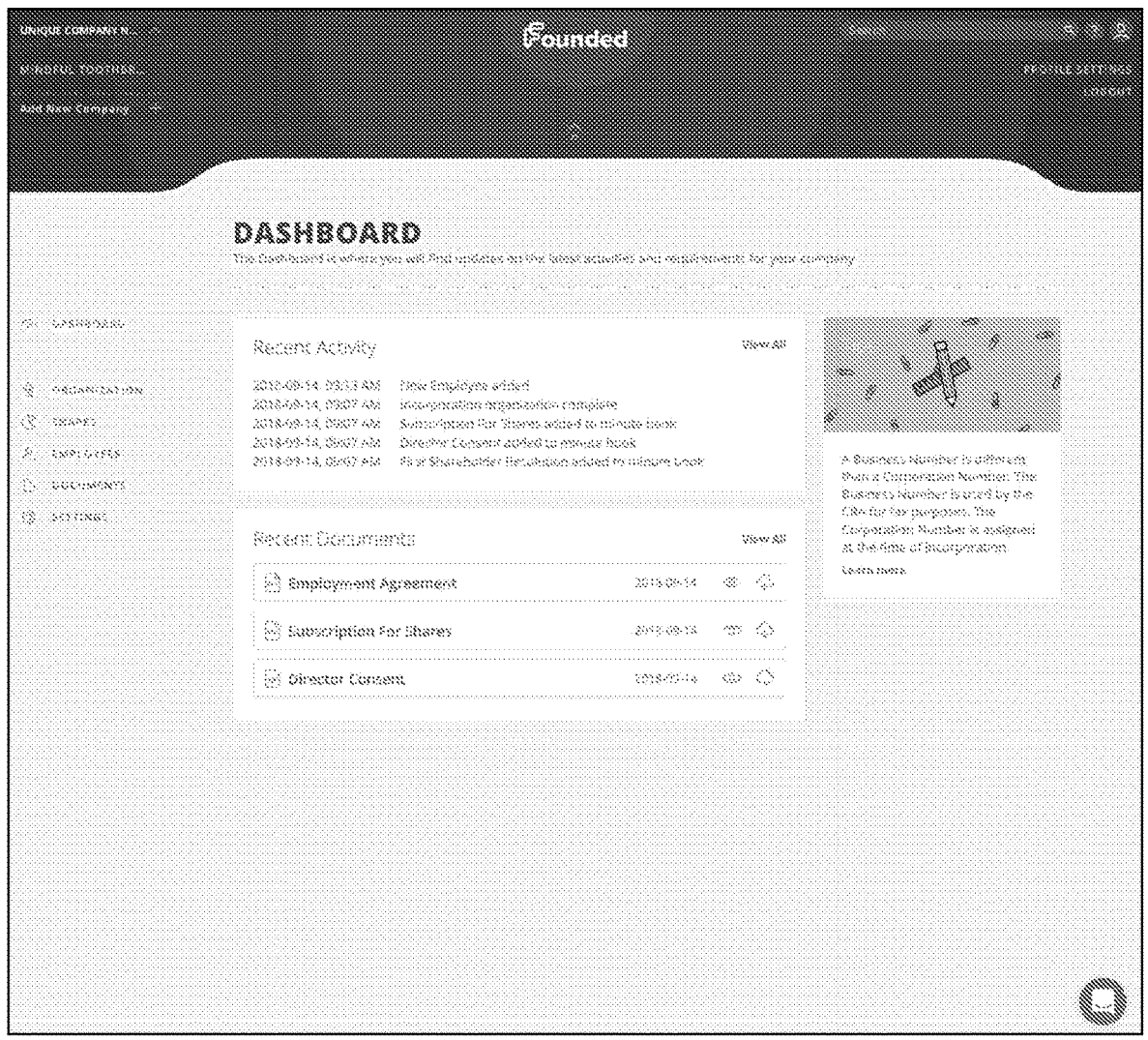
FIG. 20C shows a screenshot of a fourth dashboard screen generated by the record management tool of FIG. 1.

At certain times, such as indicated in FIG. 20C, no recent major events have happened. In such cases no comment, such as comment 2700 of FIGS. 20A and 20B, is presented. In the absence of a significant event, the user may be permitted to simply explore using the interface, such as to check corporate details, retrieve or review documents, or take other standard actions.

Figure 20D:
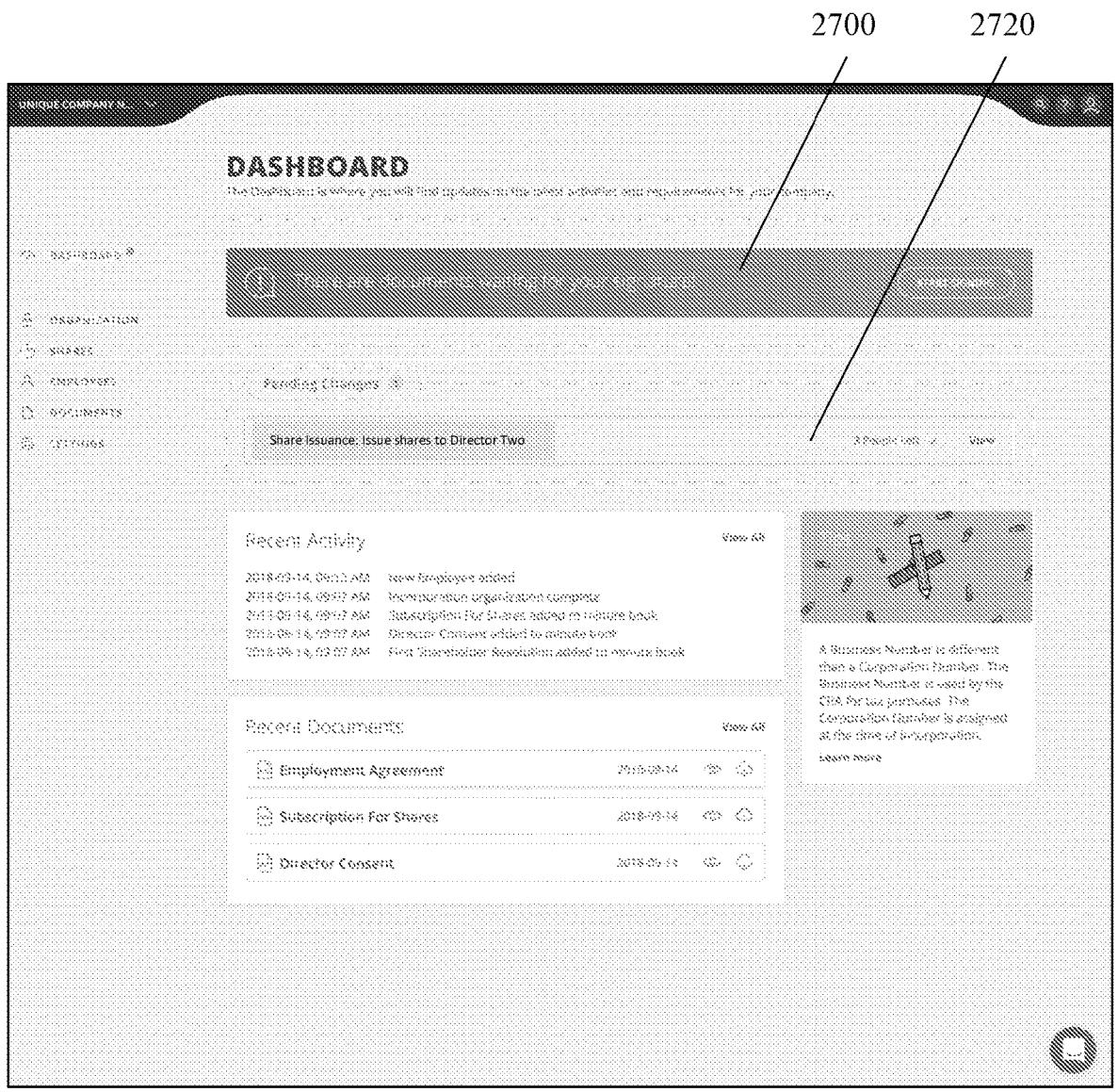
FIG. 20D shows a screenshot of a fifth dashboard screen generated by the record management tool of FIG. 1.
Figure 20E:
FIG. 20E shows a screenshot of a sixth dashboard screen generated by the record management tool of FIG. 1.

At certain time, such as indicated in FIGS. 20D and 20E, a user may be asked to take an action. Comment 2700 of FIGS. 20D and 20E notifies a user that there are documents waiting for signature. In addition, information box 2720 provides the user with options for interacting with the document that requires their signature or with information about the document. As shown particularly in FIG. 20E, a user may be able to access a dropdown menu 2730 to see who it is that needs to act for a document to be completed. Dropdown menu 2730 also provides the option of resending the document to a user from whom action is needed, or of otherwise reminding the user to take the action.

In some embodiments, the creation of annual returns and other documents may be automated, as well as the submission of the documents to the relevant government authorities. In some embodiments, documents automatically created by a record bank module need to be approved prior to being filed by an AutoClerk module, with the approval coming from a user with appropriate authority, such as a director, in-house corporate counsel or external corporate counsel.

Figure 20F:
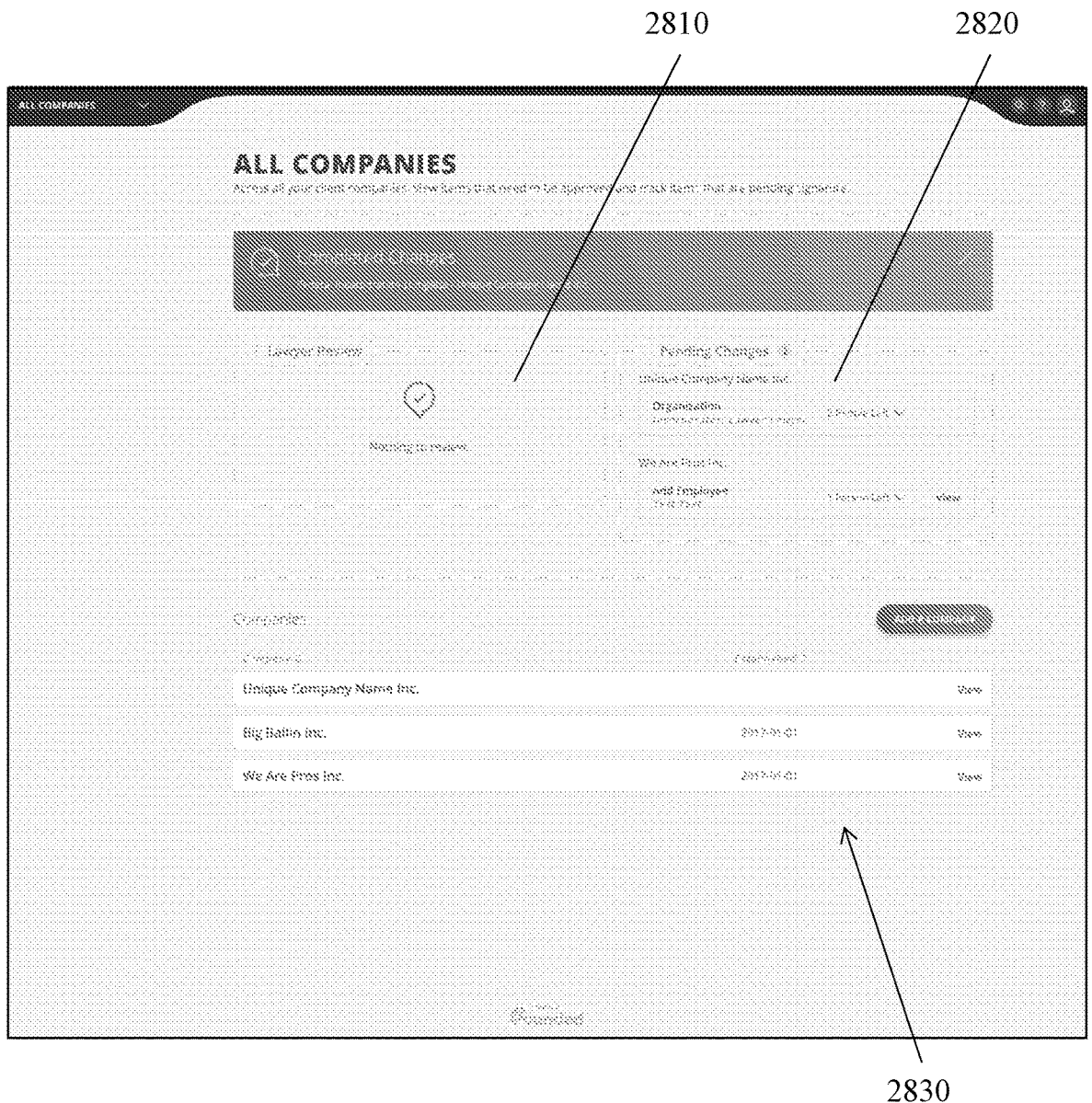
FIG. 20F shows a screenshot of a seventh dashboard screen generated by the record management tool of FIG. 1.

As indicated above, different account types and permission levels are made available by the system of FIGS. 1 to 20. A professional account type designed for external legal counsel is provided with a lawyer dashboard. A screenshot of an example of a lawyer dashboard is shown in FIG. 20F. The screenshot of FIG. 20F shows a layer dashboard which provides the lawyer with information about all of the companies that the professional account is linked to. Such a dashboard permits the user to manage professional-account aspects of a number of unrelated companies that they are associated with the professional account. The screenshot shows a review interface 2810, which notifies the professional user of changes that are awaiting their review. The screenshot shows a pending changes interface 2820, which notifies the professional user of changes which are awaiting action by another actor and provides the professional user with information about what is needed and from whom. The screenshot also shows a listing of companies 2830, which the professional user can use to navigate to dashboards for specific companies to allow them to access further information and take further actions.

Similar dashboards may be provided to other categories or types of professional users. For example, dashboards may be provided for external accountant accounts, in-house legal accounts, and other professional accounts.

Figure 20G:
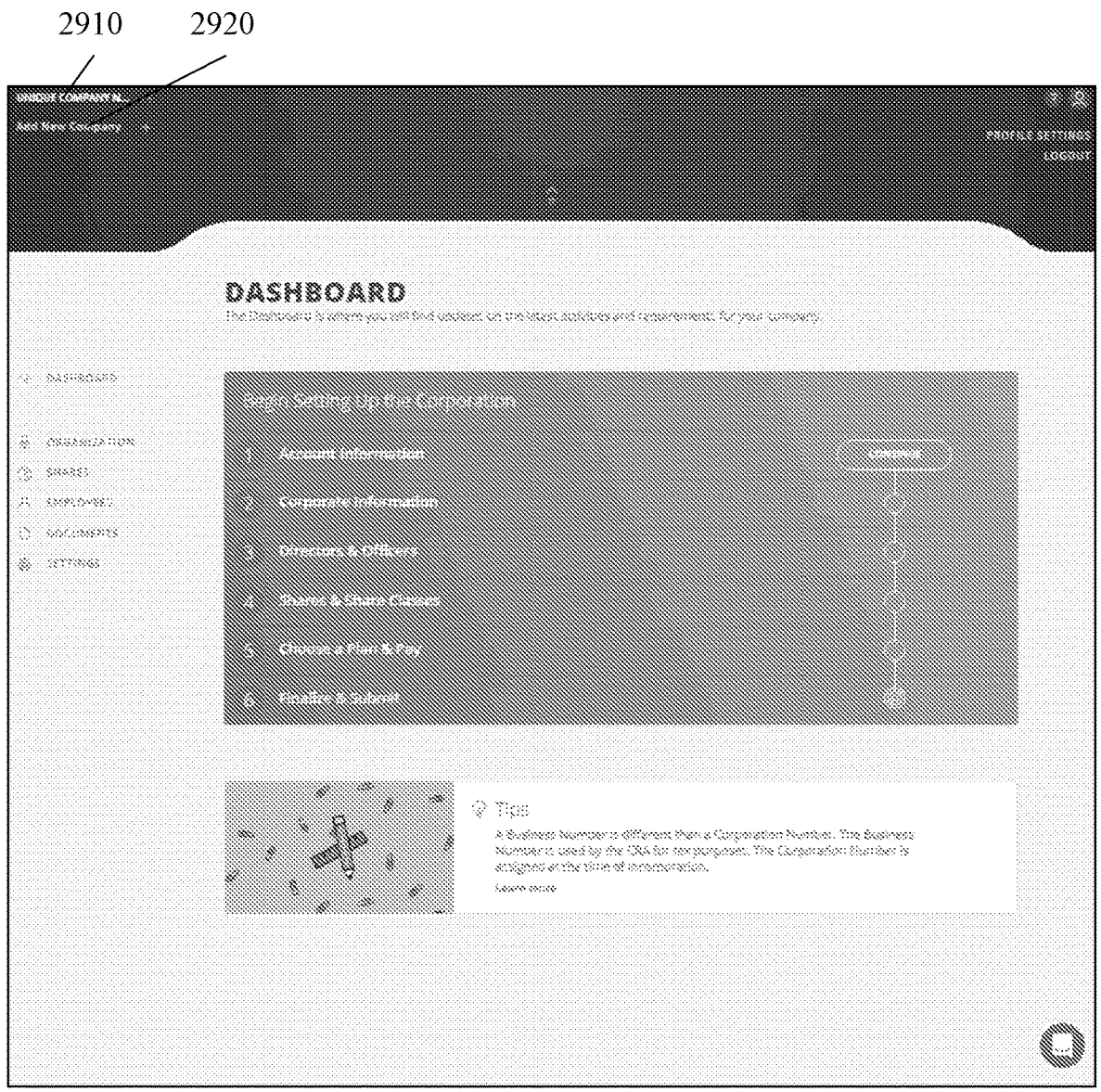
FIG. 20G shows a screenshot of an eighth dashboard screen generated by the record management tool of FIG. 1.

As indicated in FIG. 20G, if a user is finished interacting with a first interface, they may be presented with the option of taking actions in respect of a second or further company. As indicated in FIG. 20G, for most users the interface options will each be linked to a particular company; in the screenshot of FIG. 20G a user is presented with notice that actions taken presently are in relation to company UNIQUE COMPANY NAME via toggle 2910. However, via toggle 2920, the user is also presented with the option of working with a different company. In some embodiments, a user may have permission to work with a plurality of companies, each linked to the user's account even if the companies are not related to one another. In some embodiments, such as shown in FIG. 20F, further interfaces, such as an ALL COMPANIES interface, may also be available.

As the record management tool collects the necessary corporate information, documents are created, updated, stored, filed, and made available to users. Document filing may take the form of depositing the document in the library provided by the record management tool and may also take the form of submitting the document to a relevant authority such as an incorporations authority, as indicated above, through an AutoClerk module. In some embodiments, the record management tool monitors document creation and updating requirements on an ongoing basis, although in some embodiments document creation and updating is triggered by an event or is periodic.

Figure 21:
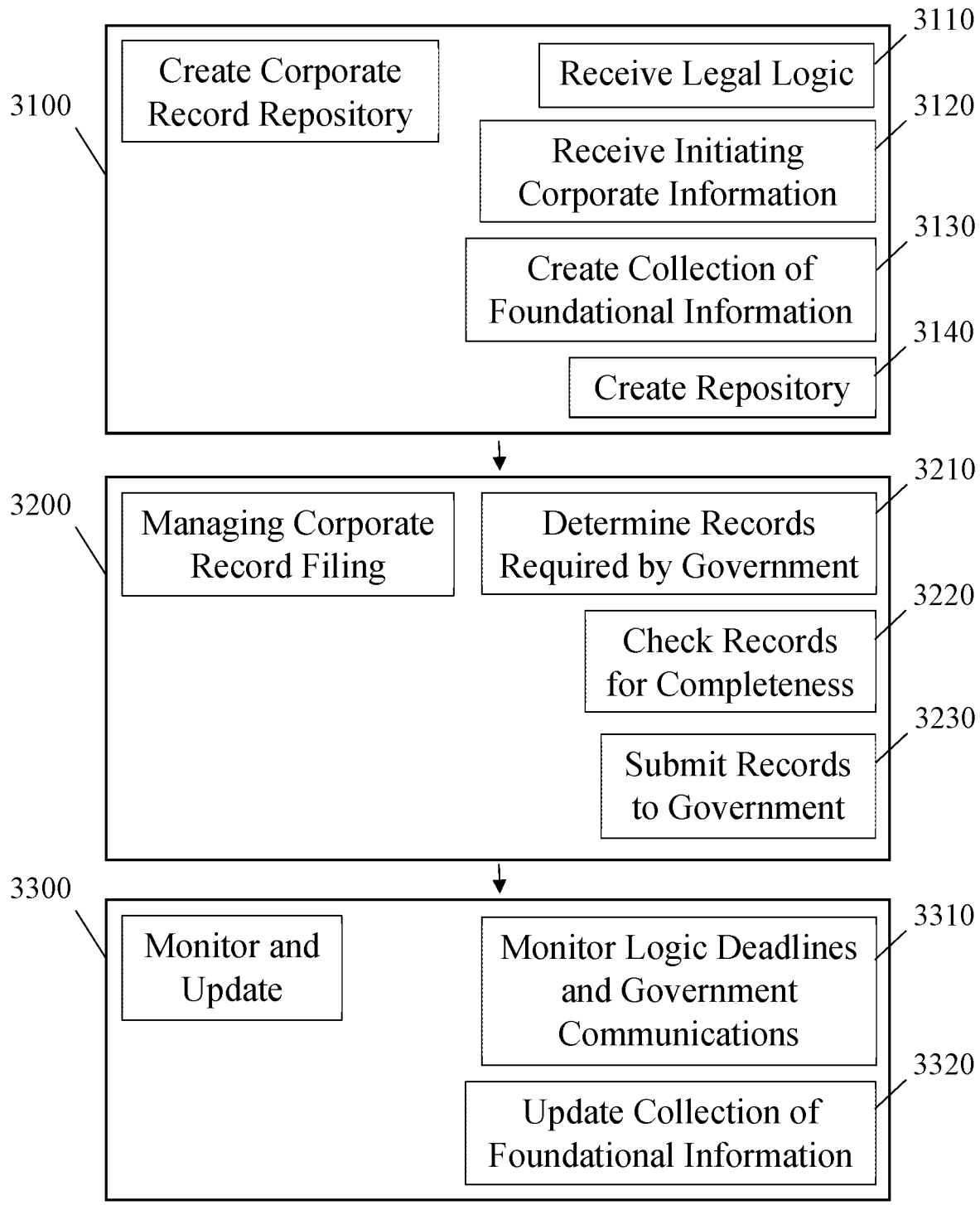
FIG. 21 shows a flow diagram of the operation of records management tool, according to an embodiment.

As depicted in FIG. 21, embodiments of a document management system follow a series of steps wherein a corporate record repository is created at step 3100, corporate record filing is managed at step 3200, and ongoing monitoring and updating of corporate information and records is carried out 3300.

To create a corporate records repository at step 3100, the system receives legal logic at step 3110, receives initiating corporate information from an initiating user at step 3120, initialises a collection of foundational information at step 3130, the collection of foundational information containing at least a subset of the initiating corporate information, and then creates a repository at step 3140 to contain records formed by a record bank module combining foundational information with record frameworks provided to the system to create corporate records.

Since incorporation authorities and other government bodies typically oversee the creation and existence of a corporation, at step 3200 the system determines the records that need to be submitted to the relevant government bodies at step 3210. In some embodiments, such a determination is made based on logic rules of the system. For example, the system will determine the governmental jurisdiction and department to receive the records, be it a federal level department, a state level department, or another body. The system will then populate the forms required under the regulations applicable to the relevant jurisdiction or create the required documents. The system also includes a mandatory completeness check at step 3220, such as by a professional user. If the records are approved as complete, they are the submitted to the relevant government authorities or agencies at step 3230. In some embodiments the system also checks whether the records need to be submitted, as some records may not need to be submitted or may not need to be submitted right away.

Since a complete and accurate collection of information and records relating to a corporation changes over the life of a typical corporation, the system also monitors and updates information and records at step 3300. At step 3310 the system monitors a combination of government communications and internal deadlines set by logic rules, to determine if action on the part of the system is needed. For example, deadlines for annual corporate filings are tracked by the record management system, and the appropriate records are generated and distributed in advance of those deadlines without any manual action by a user. If the system determines that action is needed, it takes the appropriate action, such as prompting a user for input or otherwise collecting information. If logic or user instructions indicate that an updating of the collection of foundational information is needed, then this updating is performed at step 3320.

Figure 22:
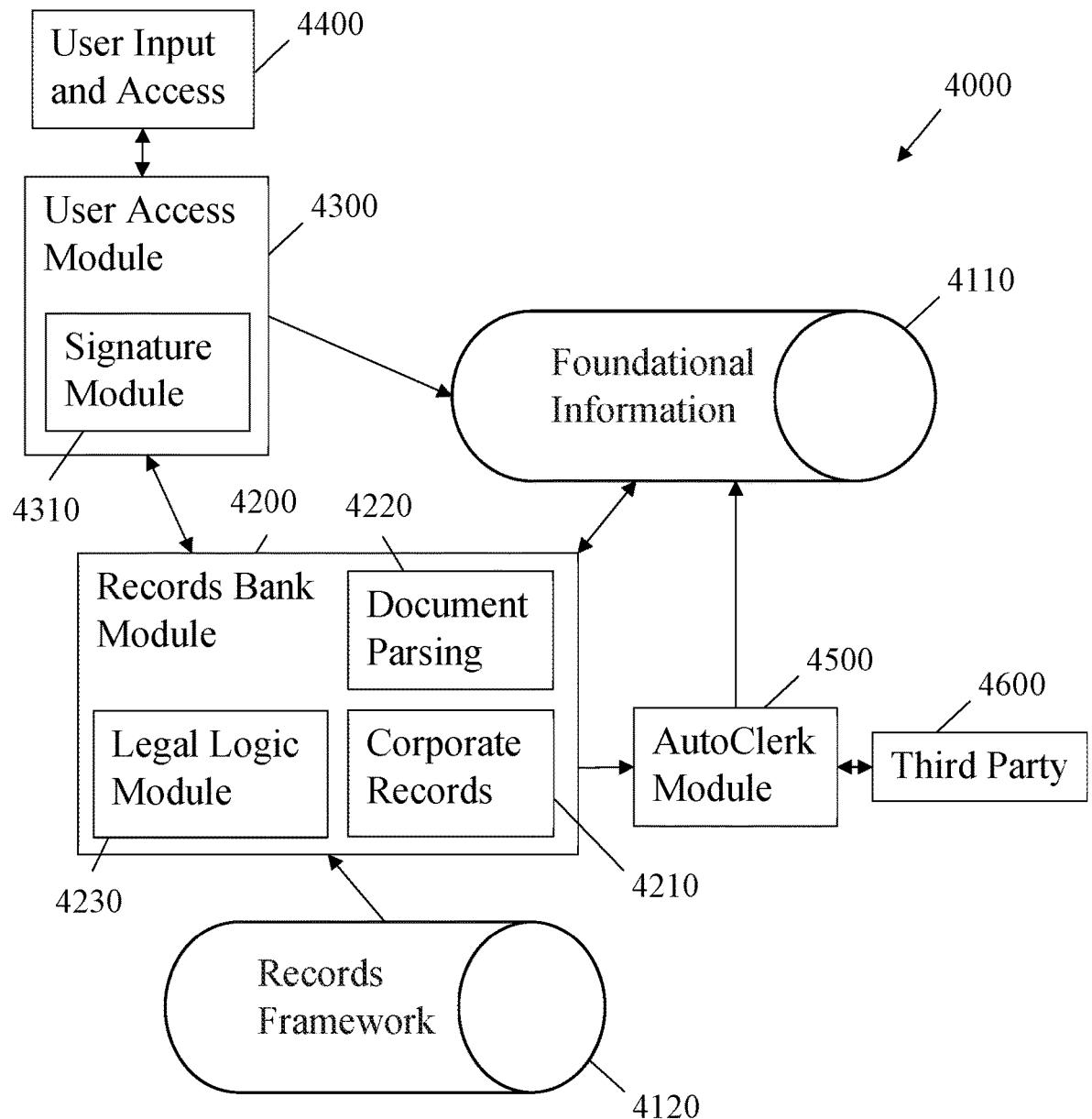
FIG. 22 shows a schematic diagram of a records management tool, according to an embodiment.

In some embodiments, such as depicted in FIG. 22, a system 4000 is employed. In the embodiment depicted, the system 4000 includes storage devices containing the collection of foundational information 4110 and records frameworks 4120. A record bank module 4200 receives information from the storage devices and from a user access module 4300 through which a user retrieves or provides information 4400 to system 4000. Where a signature is required, the user access module may incorporate or implement a signature module 4310 to request a signature. In other embodiments, a signature module may be implemented as part of the records bank module or as a stand-alone module. The record bank module 4200 of system 4000 is configured to create corporate records 4210, which may be provided to a user access module 4300 to be provided to a user. The corporate records 4210 may also be provided to an AutoClerk module 4500 to be filed with a third party 4600 such as a government authority. The records bank module 4200 also includes a legal logic module 4230 to apply logic as described elsewhere herein, such as to determine how to apply a document template to create a document. In some embodiments, the legal logic module is a standalone module. The AutoClerk module 4500 is also configured to receive communications from the third party 4600, and to determine if such communications contain information that needs to be added to the collection of foundational information 4110; if the communications do contain information that needs to be added to the collection of foundational information, the AutoClerk is configured to update the collection. The collection of foundational information can be populated via user input through the user access module 4300, information collected by the record bank module 4200 through the parsing of documents 4220 provided to the record bank module 4200, and information provided by the AutoClerk module 4500.

System 4000 is configured to continually update information and records to establish a corporation and to maintain the corporation in compliance with government regulations. System 4000 is also configured to provide ongoing access to the updated information and records to a user.

Figure 23:
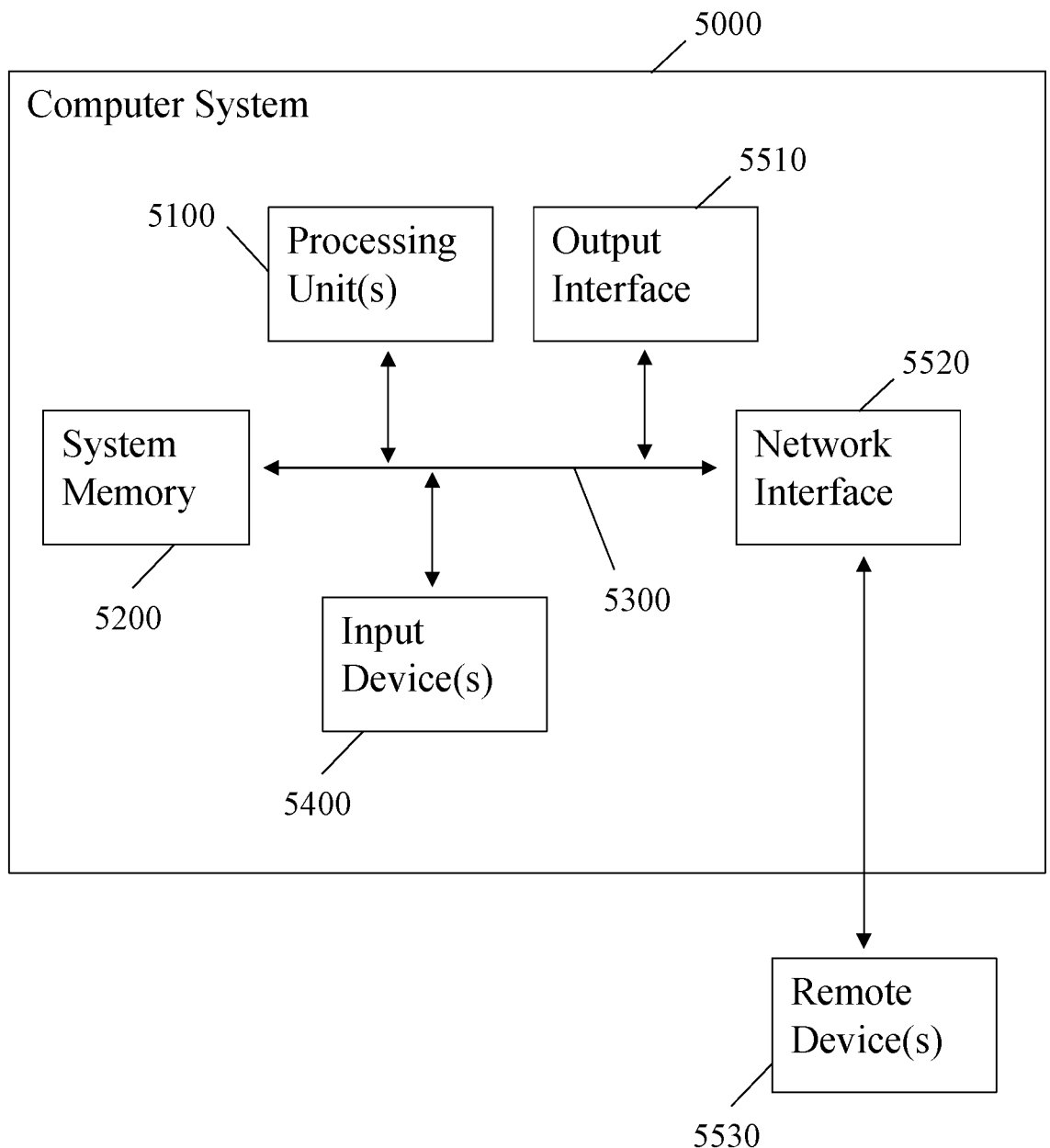
FIG. 23 shows a schematic diagram of a computer system for use with a records management tool, according to an embodiment.

Embodiments of the present invention may be implemented using devices, including the computer system 5000 depicted in FIG. 23. The computer system 5000 may execute computer instructions to perform steps involved in determining which actions to take, presenting prompts or information to a user, submitting records to third parties, forming records from frameworks and information, and other processing related to embodiments of the present invention.

As depicted in FIG. 23, a computer system 5000 may include a processing unit 5100 and a system memory 5200 which may be interconnected across a system bus or network 5300 and may be more commonly referred to as desktop, laptop, tablet, mobile and other computing devices. The computer system 5000 may have access to computer readable media, and the system memory 5200 may include computer readable storage media in the form of volatile and/or non-volatile memory such as read-only memory and/or random-access memory. In some embodiments system memory may include an operating system, application programs, and program data.

A user may interface with a computer system depicted in FIG. 23 through input devices 5400, such as a mouse or keyboard, to provide information and instructions. A user may receive information from the system from output devices, such as a monitor or network 5510 or output interface 5520, such as to receive records or prompts. In most embodiments the computer system may be networked and operate in a client-server arrangement over a network, such as a company intranet or the Internet. In some embodiments, the system may be operable as a distributed system, and the computer system may also be able to access distributed databases 5530 for information or processing capability.

In some embodiments, a server, such as a cloud server, processes logic rules, such as logic rules set by a corporate logic module, to determine what to provide to a client device and verify in what state of completeness the material is provided. For example, logic rules may include which document templates to send, how much of each document template to send based on information already available to the server, directions for the client device regarding what further information is needed, and directions for the client device regarding how to use the further information to render a document from the information provided to the client device. In some embodiments, all logic processing is done at a server level with a client device collecting information and transmitting it to the server to be used in logic processing and document rendering. In some embodiments, a client device may be provided with a few options by a server to allow the client device to dynamically update a template based on information received, such as by allowing the client device to create as many signature spaces as user-provided information indicates are necessary. In some embodiments, a client device is in frequent periodic communication with a server, but only to frequently save user input on the server as the user input is being entered on the client device.

In some embodiments transmissions and storage are encrypted. In some embodiments, encryption may be industry standard encryption. For example, transmissions between a client device and the server may be Secure Sockets Layer ('SSL') encrypted.

Some embodiments may be implemented as a system, a method, or a computer program product. Accordingly, aspects of the invention may take the form of an entirely hardware embodiment, an entirely software embodiment (such as including firmware and resident software) or an embodiment combining software and hardware aspects. Aspects of some embodiments may take the form of a computer program produced embodied in one or more computer readable media having computer readable program code embodied therewith.

Various embodiments of the invention have been described in detail. Since changes in and or additions to the above-described best mode may be made without departing from the nature, spirit or scope of the invention, the invention is not to be limited to those details but only by the appended claims.

What is claimed is:

1. A system for managing corporate information, comprising:
   at least one database configured to store a set of corporate information associated with a designated corporation, a set of corporation-specific logic rules associated with the designated corporation, a set of corporate records associated with the designated corporation, and a set of corporate templates;
   a record bank module coupled to the at least one database, the record bank module configured to receive a corporate record request from a managing user, the corporate record request requesting the creation of a new corporate record to be added to the set of corporate records, and, in response to the corporate record request:
   determine a requested corporate template of the set of corporate templates matching the corporate record request,
   determine a set of requested record information needed to populate the requested corporate template,
   populate the set of requested record information from the set of corporate information, the set of corporation-specific logic rules, and the set of corporate records;
   generate the requested corporate record from the set of requested record information and the requested corporate template, and
   update the set of corporate records to include the requested corporate record in the at least one database; and
   an external-interfacing clerk module coupled to the at least one database and the record bank module, the external-interfacing clerk module configured to determine that an action is needed and to perform the action, the action including at least one of submitting a record of the set of corporate records to an official body or updating a record of the set of corporate records in response to a notice from the official body.

2. The system of claim 1, wherein the record bank module is further configured, as part of populating the set of requested record information from the set of corporate information, the set of corporation-specific logic rules, and the set of corporate records, to:
   determine that a set of missing information of the set of requested record information is missing from the set of corporate information, the set of corporation-specific logic rules, and the set of corporate records stored on the at least one database;
   generate an invitation for the user to provide the missing information of the set of requested record information; and
   receive the missing information from the at least one managing user.

3. The system of claim 2, further comprising a digital interface module coupled to the at least one database, the digital interface module configured to provide a digital interface for a managing user to access the set of corporate records.

4. The system of claim 3, wherein the digital interface is configured to receive the invitation generated by the record bank module, and to present the invitation to the managing user as a prompt.

5. The system of claim 3, wherein the digital interface module is configured to receive a corporate initiation request from a user, to present a structured name prompt to the user, receive a corporate name from the user, access an analysis of the corporate name, and present the analysis to the user.

6. The system of claim 5, wherein the analysis includes a search of the corporate name in a government corporate name database.

7. The system of claim 2, wherein the record bank module is configured to determine that a signature is required, and to generate the invitation as comprising a signature request.

8. The system of claim 7, further comprising a digital interface configured to receive the signature invitation and generate a presentation of the unsigned document for a managing user, the presentation including a summary view and a full document view.

9. The system of claim 1, wherein the record bank module is further configured, following receiving a corporate record request, to:
    determine that the requested corporate record affects how logic rules should be applied; and
    update the set of corporation-specific logic rules to reflect the corporate record request.

10. The system of claim 9, wherein the corporate record request is a request for a shareholders agreement assigning a power from a group of directors to a group of shareholders, and updating the set of corporate-specific logic rules includes replacing a rule regarding control of the power by the group of directors with a rule regarding control of the power by the group of shareholders.

11. The system of claim 1, wherein the record bank module is configured to request a professional user approval prior to storing the requested corporate record in the at least one database.

12. A method of maintaining a corporate document collection, comprising:
    receiving, at a record management system, a set of foundational information corresponding to a corporation;
    receiving, at the record management system, a template corporate record;
    receiving, at the record management system, a set of corporate logic rules relating to a set of corporate governance compliance requirements;
    determining, at the record management system and by application of the set of logic rules, that a corporate record is required;
    generating, at the record management system, the corporate record from at least the set of foundational information and the template corporate record;
    determining, at the record management system, a government authority that requires the corporate record; and
    submitting the corporate record to the government authority.

13. A computer-implemented method for managing corporate information, comprising:
    receiving, via a digital interface, a corporate record request requesting the creation of a new corporate record to be added to the set of corporate records;
    determining a requested corporate template matching the corporate record request from a set of corporate templates stored in at least one database, the at least one database configured to store a set of corporate information associated with a designated corporation, a set of corporation-specific logic rules associated with the designated corporation, a set of corporate records associated with the designated corporation, and the set of corporate templates;
    determining a set of requested record information needed to populate the requested corporate template,
    populating the set of requested record information from the set of corporate information, the set of corporation-specific logic rules, and the set of corporate records;
    generating the requested corporate record from the set of requested record information and the requested corporate template,
    updating the set of corporate records to include the requested corporate record in the at least one database; and
    determining that an action is needed and to perform the action, the action including at least one of submitting a record of the set of corporate records to an official body or updating a record of the set of corporate records in response to a notice from the official body.

14. The method of claim 13, wherein populating the set of requested record information from the set of corporate information, the set of corporation-specific logic rules, and the set of corporate records comprises:
    determining that a set of missing information of the set of requested record information is missing from the set of corporate information, the set of corporation-specific logic rules, and the set of corporate records stored on the at least one database;
    generating an invitation for the user to provide the missing information of the set of requested record information; and
    receiving the missing information from the at least one managing user.

15. The method of claim 14, comprising providing the digital interface for a managing user to access the set of corporate records.

16. The method of claim 15, wherein the digital interface is configured to receive a corporate initiation request from a user, to present a structured name prompt to the user, receive a corporate name from the user, access an analysis of the corporate name, and present the analysis to the user.

17. The method of claim 16, wherein the analysis includes a search of the corporate name in a government corporate name database.

18. The method of claim 14, comprising determining that a signature is required, and to generate the invitation as comprising a signature request; receiving the signature invitation and generating a presentation of the unsigned document for a managing user, the presentation including a summary view and a full document view.

19. The method of claim 13, comprising:
    determining that the requested corporate record affects how logic rules should be applied; and
    updating the set of corporation-specific logic rules to reflect the corporate record request.

20. The method of claim 19, wherein the corporate record request is a request for a shareholders agreement assigning a power from a group of directors to a group of shareholders, and updating the set of corporate-specific logic rules includes replacing a rule regarding control of the power by the group of directors with a rule regarding control of the power by the group of shareholders.

* * * * *